(12) United States Patent
Soltys et al.

(10) Patent No.: US 7,770,893 B2
(45) Date of Patent: Aug. 10, 2010

(54) METHOD, APPARATUS AND ARTICLE FOR EVALUATING CARD GAMES, SUCH AS BLACKJACK

(75) Inventors: Richard Soltys, Newcastle, WA (US); Richard Huizinga, Newcastle, WA (US); Robert B. Mouchou, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 251 days.

(21) Appl. No.: 11/112,793

(22) Filed: Apr. 21, 2005

(65) Prior Publication Data

US 2005/0206078 A1 Sep. 22, 2005

Related U.S. Application Data

(60) Continuation of application No. 10/756,044, filed on Jan. 13, 2004, now Pat. No. 6,964,612, which is a division of application No. 09/790,480, filed on Feb. 21, 2001, now Pat. No. 6,685,568.

(51) Int. Cl.
*A63F 13/00* (2006.01)
(52) U.S. Cl. .................. 273/149 R; 273/149 P
(58) Field of Classification Search ............. 273/149 R, 273/149 P; 463/27
See application file for complete search history.

(56) References Cited

U.S. PATENT DOCUMENTS 1,034,402 A  7/1912  Hardy
1,727,800 A  9/1929  Albert
1,890,504 A  12/1932  Ferguson, Jr.
2,663,418 A  12/1953  Grunwald ..................... 206/62

(Continued)

FOREIGN PATENT DOCUMENTS

DE   3807127 A1 * 9/1989

(Continued)

OTHER PUBLICATIONS

Bulavsky, J., "Tracking the Tables," *Casino Journal*, pp. 44-47, May 2004.

(Continued)

*Primary Examiner*—Dmitry Suhol
*Assistant Examiner*—Malina K Rustemeyer
(74) *Attorney, Agent, or Firm*—Seed IP Law Group PLLC

(57) ABSTRACT

A system reads an identifier from a hand of cards to identify the cards. For example, the system can read an identifier from a pair of cards forming the initial hand in blackjack, where the one card is face up and the other card is face down. The system determines the value of a hand of cards form the read identifiers. For example, the system can determine a value of an initial hand of two cards in blackjack, while only one card is face up. The system can inform a dealer of the value, or status based on value, of the hand. The system can determine whether cards forming a hand of cards are authenticate by validating the cards based on the read identifier. The system can determine if the cards forming the hand of cards are in an expected sequence based on a knowledge of the initial sequence of cards in a deck.

27 Claims, 23 Drawing Sheets

U.S. PATENT DOCUMENTS

| | | | |
|---|---|---|---|
| 2,694,662 A | 11/1954 | Hunter, Jr. ................ 154/121 |
| 3,222,071 A | 12/1965 | Lang ....................... 273/149 |
| 3,312,473 A | 4/1967 | Friedman et al. ........... 273/149 |
| 3,377,070 A | 4/1968 | Nottoli ..................... 273/149 |
| 3,493,728 A | 2/1970 | Braden, Jr. et al. |
| 3,561,756 A | 2/1971 | Barnett ...................... 271/41 |
| 3,667,759 A | 6/1972 | Barr ....................... 273/152.1 |
| 3,690,670 A | 9/1972 | Cassady et al. ........ 273/149 P |
| 3,751,041 A | 8/1973 | Seifert .................. 273/149 P |
| 3,752,962 A | 8/1973 | Greskovics ............. 235/61.11 |
| 3,787,660 A | 1/1974 | Meyers et al. .......... 235/61.9 R |
| 3,814,436 A | 6/1974 | Boren ................... 273/149 P |
| 3,907,282 A | 9/1975 | Hunter ..................... 271/233 |
| 4,031,376 A | 6/1977 | Corkin, Jr. ................. 235/156 |
| 4,108,361 A | 8/1978 | Krause ..................... 235/375 |
| 4,135,663 A | 1/1979 | Nojiri et al. ............... 235/463 |
| 4,244,582 A | 1/1981 | Raees et al. ............... 273/293 |
| 4,373,726 A | 2/1983 | Churchill et al. ........ 273/138 A |
| 4,377,285 A | 3/1983 | Kadlic .................... 273/148 A |
| 4,448,419 A | 5/1984 | Telnaes .................. 273/143 R |
| 4,531,187 A | 7/1985 | Uhland ..................... 364/412 |
| 4,534,562 A | 8/1985 | Cuff et al. ............... 273/149 P |
| 4,636,846 A | 1/1987 | Villarreal .................. 358/100 |
| 4,662,637 A | 5/1987 | Pfeiffer .................. 273/149 P |
| 4,667,959 A | 5/1987 | Pfeiffer et al. ........... 273/149 R |
| 4,693,480 A | 9/1987 | Smith ....................... 273/296 |
| 4,711,452 A | 12/1987 | Dickinson et al. ........ 273/143 R |
| 4,725,079 A | 2/1988 | Koza et al. .................. 283/73 |
| 4,728,108 A | 3/1988 | Neuwahl ................... 273/296 |
| 4,750,743 A | 6/1988 | Nicoletti ................. 273/148 A |
| 4,814,589 A | 3/1989 | Storch et al. ............... 235/375 |
| 4,817,528 A | 4/1989 | Baker ....................... 101/395 |
| 4,822,050 A | 4/1989 | Normand et al. ......... 273/149 P |
| 4,832,341 A | 5/1989 | Muller et al. .............. 273/293 |
| 4,885,700 A | 12/1989 | Kondziolka et al. ......... 364/519 |
| 4,951,950 A | 8/1990 | Normand et al. ......... 273/149 P |
| 4,995,615 A | 2/1991 | Cheng ...................... 273/292 |
| 5,039,102 A | 8/1991 | Miller ................... 273/148 R |
| 5,050,881 A | 9/1991 | Nagao ................... 273/143 R |
| 5,053,612 A | 10/1991 | Pielemeier et al. ......... 235/462 |
| 5,067,713 A | 11/1991 | Soules et al. ........... 273/149 P |
| 5,103,081 A | 4/1992 | Fisher et al. ................ 235/464 |
| 5,110,134 A | 5/1992 | Laughlin et al. ............ 273/293 |
| 5,114,153 A | 5/1992 | Rosenwinkel et al. ....... 273/292 |
| 5,121,921 A | 6/1992 | Friedman et al. ......... 273/149 P |
| 5,157,602 A | 10/1992 | Fields et al. ................ 364/412 |
| 5,186,464 A | 2/1993 | Lamle ................... 273/149 R |
| 5,199,710 A | 4/1993 | Lamle ................... 273/149 R |
| 5,224,712 A | 7/1993 | Laughlin et al. ............ 273/304 |
| 5,259,907 A | 11/1993 | Soules et al. ............... 156/277 |
| 5,283,422 A | 2/1994 | Storch et al. ............... 235/375 |
| 5,312,104 A | 5/1994 | Miller ................... 273/148 R |
| 5,319,181 A | 6/1994 | Shellhammer et al. ...... 235/462 |
| 5,343,028 A | 8/1994 | Figarella et al. ............. 235/462 |
| 5,362,053 A | 11/1994 | Miller ................... 273/148 R |
| 5,374,061 A | 12/1994 | Albrecht ................ 273/149 R |
| 5,397,133 A | 3/1995 | Penzias ..................... 273/439 |
| 5,416,308 A | 5/1995 | Hood et al. ................. 235/454 |
| 5,417,431 A | 5/1995 | Gluck ....................... 273/293 |
| 5,431,399 A | 7/1995 | Kelley .................... 273/149 P |
| 5,511,784 A | 4/1996 | Furry et al. ............... 273/143 R |
| 5,518,249 A | 5/1996 | Sines et al. ................. 273/304 |
| 5,548,110 A | 8/1996 | Storch et al. ............... 235/472 |
| 5,586,936 A | 12/1996 | Bennett et al. .............. 463/25 |
| 5,605,334 A | 2/1997 | McCrea, Jr. ................ 273/309 |
| 5,605,504 A | 2/1997 | Huang ....................... 463/22 |
| 5,613,680 A | 3/1997 | Groves et al. ............ 273/138.2 |
| 5,613,912 A | 3/1997 | Slater ........................ 463/25 |
| 5,632,483 A | 5/1997 | Garczynski et al. ..... 273/148 R |
| 5,654,050 A | 8/1997 | Whalen-Shaw ........... 428/35.7 |
| 5,655,961 A | 8/1997 | Acres et al. ................. 463/27 |
| 5,669,816 A | 9/1997 | Garczynski et al. ........... 463/12 |
| 5,681,039 A | 10/1997 | Miller ................... 273/148 R |
| 5,698,839 A | 12/1997 | Jagielinski et al. .......... 235/493 |
| 5,704,835 A | 1/1998 | Dietz, II ..................... 463/20 |
| 5,707,287 A | 1/1998 | McCrea, Jr. ................. 463/27 |
| 5,711,525 A | 1/1998 | Breeding ................... 273/292 |
| 5,722,891 A | 3/1998 | Inoue ........................ 463/20 |
| 5,722,893 A * | 3/1998 | Hill et al. ..................... 463/47 |
| 5,735,525 A | 4/1998 | McCrea, Jr. ................ 273/309 |
| 5,735,742 A | 4/1998 | French ....................... 463/25 |
| 5,755,618 A | 5/1998 | Mothwurf ................... 453/17 |
| 5,757,876 A | 5/1998 | Dam et al. .................... 377/7 |
| 5,766,074 A | 6/1998 | Cannon et al. ............... 463/16 |
| 5,770,533 A | 6/1998 | Franchi ...................... 463/42 |
| 5,772,505 A | 6/1998 | Garczynski et al. ........... 463/12 |
| 5,779,545 A | 7/1998 | Berg et al. ................... 463/22 |
| 5,779,546 A | 7/1998 | Meissner et al. ............. 463/25 |
| 5,780,831 A | 7/1998 | Seo et al. ................... 235/462 |
| 5,781,647 A | 7/1998 | Fishbine et al. ............... 382/1 |
| 5,785,321 A | 7/1998 | van Putten et al. .......... 273/309 |
| 5,788,573 A | 8/1998 | Baerlocher et al. ........... 463/16 |
| 5,791,988 A | 8/1998 | Nomi ........................ 463/11 |
| 5,801,766 A | 9/1998 | Alden ....................... 348/157 |
| 5,803,808 A | 9/1998 | Strisower ................... 463/11 |
| 5,803,809 A | 9/1998 | Yoseloff .................... 463/13 |
| 5,809,482 A | 9/1998 | Strisower ................... 705/30 |
| 5,830,064 A | 11/1998 | Bradish et al. .............. 463/22 |
| 5,831,669 A | 11/1998 | Adrain ..................... 348/143 |
| 5,842,921 A | 12/1998 | Mindes et al. ............... 463/16 |
| 5,863,249 A | 1/1999 | Inoue ........................ 463/20 |
| 5,871,400 A | 2/1999 | Yfantis ....................... 463/22 |
| 5,895,048 A | 4/1999 | Smith, Jr. ................... 273/293 |
| 5,909,876 A | 6/1999 | Brown ...................... 273/309 |
| 5,911,626 A * | 6/1999 | McCrea, Jr. ................. 463/27 |
| 5,919,090 A | 7/1999 | Mothwurf ................... 463/25 |
| 5,919,091 A | 7/1999 | Bell et al. ................... 463/25 |
| 5,936,527 A | 8/1999 | Isaacman et al. .......... 340/572.1 |
| 5,941,769 A | 8/1999 | Order ........................ 463/12 |
| 5,941,771 A | 8/1999 | Haste, III .................... 463/17 |
| 5,945,654 A | 8/1999 | Huang ...................... 235/449 |
| 5,947,820 A | 9/1999 | Morro et al. ................... 463/9 |
| 5,949,050 A | 9/1999 | Fosbenner et al. .......... 235/449 |
| 5,954,654 A | 9/1999 | Eaton et al. ................. 600/462 |
| 5,967,893 A | 10/1999 | Lawrence et al. ............ 463/10 |
| 5,989,122 A | 11/1999 | Roblejo ..................... 463/22 |
| 6,004,207 A | 12/1999 | Wilson, Jr. et al. ........... 463/20 |
| 6,010,404 A | 1/2000 | Walker et al. ................ 463/21 |
| 6,027,115 A | 2/2000 | Griswold et al. ......... 273/143 R |
| 6,039,650 A | 3/2000 | Hill ........................... 463/47 |
| 6,042,150 A | 3/2000 | Daley ......................... 283/86 |
| 6,062,981 A | 5/2000 | Luciano, Jr. ................. 463/26 |
| 6,068,552 A | 5/2000 | Walker et al. ................ 463/21 |
| 6,093,103 A | 7/2000 | McCrea, Jr. ................. 463/27 |
| 6,113,492 A | 9/2000 | Walker et al. ................ 463/16 |
| 6,117,009 A | 9/2000 | Yoseloff ..................... 463/20 |
| 6,117,012 A | 9/2000 | McCrea, Jr. ................. 463/27 |
| 6,126,166 A | 10/2000 | Lorson et al. ............ 273/148 R |
| 6,145,838 A | 11/2000 | White ....................... 273/295 |
| 6,149,154 A | 11/2000 | Grauzer et al. ........... 273/149 R |
| 6,152,822 A | 11/2000 | Herbert ...................... 463/22 |
| 6,159,096 A | 12/2000 | Yoseloff ..................... 463/20 |
| 6,162,121 A | 12/2000 | Morro et al. ................. 463/16 |
| 6,165,069 A | 12/2000 | Sines et al. .................. 463/12 |
| 6,166,763 A | 12/2000 | Rhodes et al. .............. 348/143 |
| 6,168,520 B1 | 1/2001 | Baerlocher et al. ........... 463/16 |
| 6,186,892 B1 | 2/2001 | Frank et al. ................. 463/19 |
| 6,193,607 B1 | 2/2001 | Kay .......................... 463/22 |
| 6,196,547 B1 | 3/2001 | Pascal et al. ................ 273/292 |
| 6,217,447 B1 | 4/2001 | Lofink et al. ................ 463/12 |
| 6,227,971 B1 | 5/2001 | Weiss ........................ 463/20 |
| 6,234,898 B1 | 5/2001 | Belamant et al. ............. 463/25 |
| 6,250,632 B1 | 6/2001 | Albrecht ................ 273/149 R |
| 6,254,096 B1 | 7/2001 | Grauzer et al. ........... 273/149 R |

| Patent No. | Date | Inventor | Class |
|---|---|---|---|
| 6,254,484 B1 | 7/2001 | McCrea, Jr. | 463/27 |
| 6,267,248 B1 | 7/2001 | Johnson et al. | 209/547 |
| 6,267,671 B1 | 7/2001 | Hogan | 463/25 |
| 6,293,864 B1 | 9/2001 | Romero | 463/12 |
| 6,299,536 B1 | 10/2001 | Hill | 463/47 |
| 6,312,334 B1 | 11/2001 | Yoseloff | 463/25 |
| 6,313,871 B1 | 11/2001 | Schubert | 348/143 |
| 6,315,664 B1 | 11/2001 | Baerlocher et al. | 463/21 |
| 6,346,044 B1 | 2/2002 | McCrea, Jr. | 463/27 |
| 6,357,746 B1 | 3/2002 | Sadowski | 273/148 R |
| 6,361,044 B1 | 3/2002 | Block et al. | 273/149 R |
| 6,371,482 B1 | 4/2002 | Hall, Jr. | 273/138.1 |
| 6,394,902 B1 | 5/2002 | Glavich et al. | 463/20 |
| 6,402,142 B1 | 6/2002 | Warren et al. | 273/149 R |
| 6,403,908 B2 | 6/2002 | Stardust et al. | 209/587 |
| 6,406,369 B1 | 6/2002 | Baerlocher et al. | 463/20 |
| 6,409,595 B1 | 6/2002 | Uihlein et al. | 463/20 |
| 6,413,162 B1 | 7/2002 | Baerlocher et al. | 463/20 |
| 6,425,824 B1 | 7/2002 | Baerlocher et al. | 463/16 |
| 6,446,864 B1 | 9/2002 | Kim et al. | 235/382 |
| 6,457,715 B1 | 10/2002 | Friedman | 273/274 |
| 6,460,848 B1 | 10/2002 | Soltys et al. | 273/149 R |
| 6,464,581 B1 | 10/2002 | Yoseloff et al. | 463/20 |
| 6,468,156 B1 | 10/2002 | Hughs-Baird et al. | 463/25 |
| 6,471,208 B2 | 10/2002 | Yoseloff et al. | 273/143 R |
| 6,502,116 B1 | 12/2002 | Kelly et al. | 708/250 |
| 6,508,709 B1 | 1/2003 | Karmarkar | 463/42 |
| 6,514,140 B1 | 2/2003 | Storch | 463/25 |
| 6,517,435 B2 | 2/2003 | Soltys et al. | 463/25 |
| 6,517,436 B2 | 2/2003 | Soltys et al. | 463/20 |
| 6,517,437 B1 | 2/2003 | Wells et al. | 463/30 |
| 6,520,857 B2 | 2/2003 | Soltys et al. | 463/29 |
| 6,527,271 B2 | 3/2003 | Soltys et al. | 273/148 R |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,533,664 B1 | 3/2003 | Crumby | 463/42 |
| 6,561,897 B1 | 5/2003 | Bourbour et al. | 463/13 |
| 6,568,678 B2 | 5/2003 | Breeding et al. | 273/149 R |
| 6,579,180 B2 | 6/2003 | Soltys et al. | 463/25 |
| 6,579,181 B2 | 6/2003 | Soltys et al. | 463/25 |
| 6,582,301 B2 | 6/2003 | Hill | 463/11 |
| 6,588,750 B1 | 7/2003 | Grauzer et al. | 273/149 R |
| 6,588,751 B1 | 7/2003 | Grauzer et al. | 273/149 R |
| 6,595,857 B2 | 7/2003 | Soltys et al. | 463/29 |
| 6,599,185 B1 | 7/2003 | Kaminkow et al. | 463/16 |
| 6,629,889 B2 | 10/2003 | Mothwurf | 463/25 |
| 6,638,161 B2 | 10/2003 | Soltys et al. | 463/12 |
| 6,651,981 B2 | 11/2003 | Grauzer et al. | 273/149 R |
| 6,651,982 B2 | 11/2003 | Grauzer et al. | 273/149 R |
| 6,652,379 B2 | 11/2003 | Soltys et al. | 463/22 |
| 6,655,684 B2 | 12/2003 | Grauzer et al. | 273/149 R |
| 6,663,490 B2 | 12/2003 | Soltys et al. | 463/25 |
| 6,676,127 B2 | 1/2004 | Johnson et al. | 273/149 R |
| 6,676,516 B2 | 1/2004 | Baerlocher et al. | 463/25 |
| 6,685,568 B2 | 2/2004 | Soltys et al. | 463/47 |
| 6,688,979 B2 | 2/2004 | Soltys et al. | 463/25 |
| 6,698,759 B2 | 3/2004 | Webb et al. | 273/292 |
| 6,712,693 B1 | 3/2004 | Hettinger | 463/20 |
| 6,712,696 B2 | 3/2004 | Soltys et al. | 463/25 |
| 6,726,099 B2 | 4/2004 | Becker et al. | 235/380 |
| 6,726,205 B1 | 4/2004 | Purton | 273/148 R |
| 6,728,740 B2 | 4/2004 | Kelly et al. | 708/250 |
| 6,729,956 B2 | 5/2004 | Wolf et al. | 463/20 |
| 6,729,961 B1 | 5/2004 | Millerschone | 463/30 |
| 6,758,751 B2 | 7/2004 | Soltys et al. | 463/29 |
| 6,857,961 B2 | 2/2005 | Soltys et al. | 463/47 |
| 6,889,979 B2 | 5/2005 | Blaha et al. | 273/149 R |
| 6,955,599 B2 | 10/2005 | Bourbour et al. | 463/13 |
| 6,991,544 B2 | 1/2006 | Soltys et al. | 463/42 |
| 7,005,985 B1 | 2/2006 | Steeves | 340/572.1 |
| 7,011,309 B2 | 3/2006 | Soltys et al. | 273/149 R |
| 7,029,009 B2 | 4/2006 | Grauzer et al. | 273/149 P |
| 7,036,818 B2 | 5/2006 | Grauzer et al. | 273/149 R |
| 7,073,791 B2 | 7/2006 | Grauzer et al. | 273/149 R |
| 7,077,332 B2 | 7/2006 | Verschuur et al. | 235/492 |
| 7,137,627 B2 | 11/2006 | Grauzer et al. | 273/149 R |
| 7,222,852 B2 | 5/2007 | Soltys et al. | 273/148 R |
| 7,255,344 B2 | 8/2007 | Grauzer et al. | 273/149 R |
| 7,271,727 B2 | 9/2007 | Steeves | 340/572.7 |
| 7,309,065 B2 | 12/2007 | Yoseloff et al. | 273/292 |
| 7,322,576 B2 | 1/2008 | Grauzer et al. | 273/149 R |
| 7,384,044 B2 | 6/2008 | Grauzer et al. | 273/149 R |
| 7,427,234 B2 | 9/2008 | Soltys et al. | 463/16 |
| 7,448,626 B2 | 11/2008 | Fleckenstein | 273/149 R |
| 7,510,186 B2 | 3/2009 | Fleckenstein | 273/149 R |
| 7,510,194 B2 | 3/2009 | Soltys et al. | 273/293 |
| 2002/0063389 A1 | 5/2002 | Breeding et al. | 273/292 |
| 2002/0068635 A1* | 6/2002 | Hill | 463/47 |
| 2002/0147042 A1 | 10/2002 | Vuong et al. | 463/40 |
| 2002/0163125 A1 | 11/2002 | Grauzer et al. | 273/149 R |
| 2002/0187821 A1 | 12/2002 | Soltys et al. | 463/11 |
| 2002/0198052 A1 | 12/2002 | Soltys et al. | 463/42 |
| 2003/0032474 A1 | 2/2003 | Kaminkow | 463/25 |
| 2003/0036425 A1 | 2/2003 | Kaminkow et al. | 463/25 |
| 2003/0054878 A1 | 3/2003 | Benoy et al. | 463/29 |
| 2003/0064774 A1 | 4/2003 | Fujimoto et al. | 463/16 |
| 2003/0073498 A1 | 4/2003 | Grauzer et al. | 463/42 |
| 2003/0083126 A1 | 5/2003 | Paulsen | 463/25 |
| 2003/0090059 A1 | 5/2003 | Grauzer et al. | 273/149 R |
| 2003/0104856 A1 | 6/2003 | Wolf | 463/16 |
| 2003/0173737 A1 | 9/2003 | Soltys et al. | 273/149 R |
| 2003/0176209 A1 | 9/2003 | Soltys et al. | 463/13 |
| 2004/0067789 A1 | 4/2004 | Grauzer et al. | 463/11 |
| 2004/0100026 A1 | 5/2004 | Haggard | 273/304 |
| 2004/0108255 A1 | 6/2004 | Johnson et al. | 209/547 |
| 2004/0147327 A1 | 7/2004 | Soltys et al. | 463/47 |
| 2004/0207156 A1 | 10/2004 | Soltys et al. | 273/292 |
| 2004/0224777 A1 | 11/2004 | Smith et al. | 463/47 |
| 2005/0012270 A1 | 1/2005 | Schubert et al. | 273/149 R |
| 2005/0026680 A1 | 2/2005 | Gururajan | 463/25 |
| 2005/0026681 A1 | 2/2005 | Grauzer et al. | 463/29 |
| 2005/0026682 A1 | 2/2005 | Grauzer et al. | 463/29 |
| 2005/0051955 A1 | 3/2005 | Schubert et al. | 273/149 R |
| 2005/0051965 A1 | 3/2005 | Gururajan | 273/292 |
| 2005/0054408 A1 | 3/2005 | Steil et al. | 463/11 |
| 2005/0062226 A1 | 3/2005 | Schubert et al. | 273/149 R |
| 2005/0062227 A1 | 3/2005 | Grauzer et al. | 273/149 R |
| 2005/0073102 A1 | 4/2005 | Yoseloff et al. | 273/292 |
| 2005/0093230 A1 | 5/2005 | Grauzer et al. | 273/149 R |
| 2005/0101367 A1 | 5/2005 | Soltys et al. | 463/12 |
| 2005/0121852 A1 | 6/2005 | Soltys et al. | 273/149 P |
| 2005/0137005 A1 | 6/2005 | Soltys et al. | 463/13 |
| 2005/0146094 A1 | 7/2005 | Soltys et al. | 273/292 |
| 2005/0164761 A1 | 7/2005 | Tain | 463/13 |
| 2005/0288083 A1 | 12/2005 | Downs, III | 463/11 |
| 2005/0288084 A1 | 12/2005 | Schubert | 463/11 |
| 2005/0288085 A1 | 12/2005 | Schubert et al. | 463/11 |
| 2008/0113781 A1 | 5/2008 | Soltys et al. | 463/28 |
| 2009/0115133 A1 | 5/2009 | Kelly et al. | 273/274 |
| 2009/0117994 A1 | 5/2009 | Kelly et al. | 463/25 |
| 2009/0118001 A1 | 5/2009 | Kelly et al. | 463/29 |
| 2009/0118005 A1 | 5/2009 | Kelly et al. | 463/31 |
| 2009/0118006 A1 | 5/2009 | Kelly et al. | 463/31 |
| 2009/0170594 A1 | 7/2009 | Delaney et al. | 463/25 |

FOREIGN PATENT DOCUMENTS

| | | |
|---|---|---|
| DE | 44 39 502 | 9/1995 |
| DE | 197 48 930 A1 | 5/1998 |
| EP | 0 327 069 A2 | 8/1989 |
| EP | 0 790 848 | 8/1997 |
| EP | 1 291 045 A2 | 3/2003 |
| FR | 2 775 196 | 8/1999 |
| GB | 2 246 520 A | 2/1992 |

| | | |
|---|---|---|
| GB | 2 370 791 A | 7/2002 |
| GB | 2 380 143 A | 4/2003 |
| WO | WO 96/36253 | 11/1996 |
| WO | WO 99/43403 | 9/1999 |
| WO | WO 00/62880 | 10/2000 |
| WO | WO 02/05914 A1 | 1/2002 |
| WO | WO 02/051512 A2 | 7/2002 |
| WO | WO 03/004116 A1 | 1/2003 |
| WO | WO 2006/039308 A2 | 4/2006 |

OTHER PUBLICATIONS

Scarne, J., Scarne's *New Complete Guide to Gambling*, Simon & Schuster, New York, 1974, pp. 358-359.
U.S. Appl. No. 60/500,898, filed Sep. 5, 2003, Soltys et al.
U.S. Appl. No. 60/511,931, filed Oct. 16, 2003, Soltys et al.
U.S. Appl. No. 60/584,395, filed Jun. 30, 2004, Soltys et al.
Plaintiffs Declaration of Lawrence Luciano in Opposition to Shuffle Master's Motion for Preliminary Injunction, *Card, LLC v. Shuffle Master, Inc.*, D. Nev. (No. CV-N-03-0244-ECR-(RAM)), Nov. 24, 2003.
U.S. Appl. No. 10/885,875, filed Jul. 7, 2004, Soltys et al.
U.S. Appl. No. 10/902,436, filed Jul. 29, 2004, Soltys et al.
U.S. Appl. No. 10/962,166, filed Oct. 8, 2004, Soltys et al.
U.S. Appl. No. 11/059,743, filed Feb. 16, 2005, Soltys et al.
U.S. Appl. No. 11/337,375, filed Jan. 23, 2006, Soltys et al.
U.S. Appl. No. 11/428,240, filed Jun. 30, 2006, Fleckenstein.
U.S. Appl. No. 11/428,244, filed Jun. 30, 2006, Soltys.
U.S. Appl. No. 11/428,249, filed Jun. 30, 2006, Fleckenstein.
U.S. Appl. No. 11/428,253, filed Jun. 30, 2006, Fleckenstein.
U.S. Appl. No. 11/428,258, filed Jun. 30, 2006, Fleckenstein.
U.S. Appl. No. 11/428,264, filed Jun. 30, 2006, Soltys.
U.S. Appl. No. 11/428,286, filed Jun. 30, 2006, Soltys et al.
U.S. Appl. No. 11/437,590, filed May 19, 2006, Soltys et al.
U.S. Appl. No. 11/478,360, filed Jun. 29, 2006, Fleckenstein.
U.S. Appl. No. 11/479,930, filed Jun. 30, 2006, Soltys et al.
U.S. Appl. No. 11/479,963, filed Jun. 29, 2006, Fleckenstein.
U.S. Appl. No. 11/479,991, filed Jun. 29, 2006, Soltys.
U.S. Appl. No. 11/480,273, filed Jun. 30, 2006, Soltys.
U.S. Appl. No. 11/480,275, filed Jun. 30, 2006, Fleckenstein.
U.S. Appl. No. 11/480,295, filed Jun. 29, 2006, Fleckenstein.
U.S. Appl. No. 11/480,321, filed Jun. 30, 2006, Soltys.
U.S. Appl. No. 11/480,345, filed Jun. 30, 2006, Fleckenstein.
U.S. Appl. No. 11/480,349, filed Jun. 30, 2006, Soltys et al.
U.S. Appl. No. 11/519,244, filed Sep. 11, 2006, Soltys et al.
U.S. Appl. No. 60/838,280, filed Aug. 17, 2006, Soltys et al.
Burke, A., "Tracking the Tables," reprinted from *International Gaming & Wagering Business*, Aug. 2003, 4 pages.
Gros, R., "All You Ever Wanted to Know About Table Games," reprinted from *Global Gaming Business*, Aug. 1, 2003, 2 pages.
Pro, L.V., "Book Review—The Card Counter's Guide to Casino Surveillance," *Blackjack Insider Newsletter*, May 2003, #40, accessed Aug. 25, 2006, URL = http:/bjinsider.com/newsletter_40_surveillance.shtml, 5 pages.
Scarne, J., *Scarne's Encyclopedia of Games*, Harper & Row, New York, 1973, p. 153.
Snyder, A., "The High-Tech Eye," excerpt from *Blackjack Forum*, Spring 1997, accessed Dec. 21, 2005, from Casino Software & Services, LLC, URL = http://www.casinosoftware.com/bj_forum.html.
Terdiman, D., "Who's Holding the Aces Now?", reprinted from *Wired News*, Aug. 18, 2003, 2 pages.
Ward, K., "BJ Tracking System has Players Down for the Count," *Gaming Today*, Mar. 5, 2002, accessed Dec. 21, 2005, from Casino Software & Services, LLC, URL = http://www.casinosoftware.com/gaming_today.html.
Winkler, C., "Product Spotlight: MindPlay," reprinted from *Gaming and Leisure Technology*, Fall 2003, 2 pages.
Bally TMS, "MP21—Automated Table Tracking/Features," 2 pages, Nov. 2005.
Bally TMS, "MPBacc—Intelligent Table Tracking/Features," 2 pages, Nov. 2005.
Bally TMS, "MPBacc—Specifications/Specifications," 2 pages, Nov. 2005.
Bravo Gaming Systems, "Casino Table Wager Analysis and Player Tracking System—Table Operations/Unique Features," accessed Apr. 11, 2005, URL = http://www.genesisgaming.com, 4 pages.
Casino Software & Services, LLC., accessed August 25, 2006, URL = http:/casinosoftware.com/home.html, 6 pages.
International Guild of Hospitality & Restaurant Managers, "Shuffle Master, Inc. (NasdaqNM:SHFL)," accessed Dec. 30, 2003, URL = http://hospitalityguide.com/Financial/Casinos/Shuffle.htm, 3 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Shuffle Master, Inc., "Shuffle Master Announces New Products; Intelligent Table System to Be Debuted at G2E," Sep. 10, 2003, 2 pages.
U.S. Appl. No. 11/558,409, filed Nov. 9, 2006, Soltys.
Humble, L., *The World's Greatest Blackjack Book*, Random House, Inc., New York, 1987, p. 182.

* cited by examiner

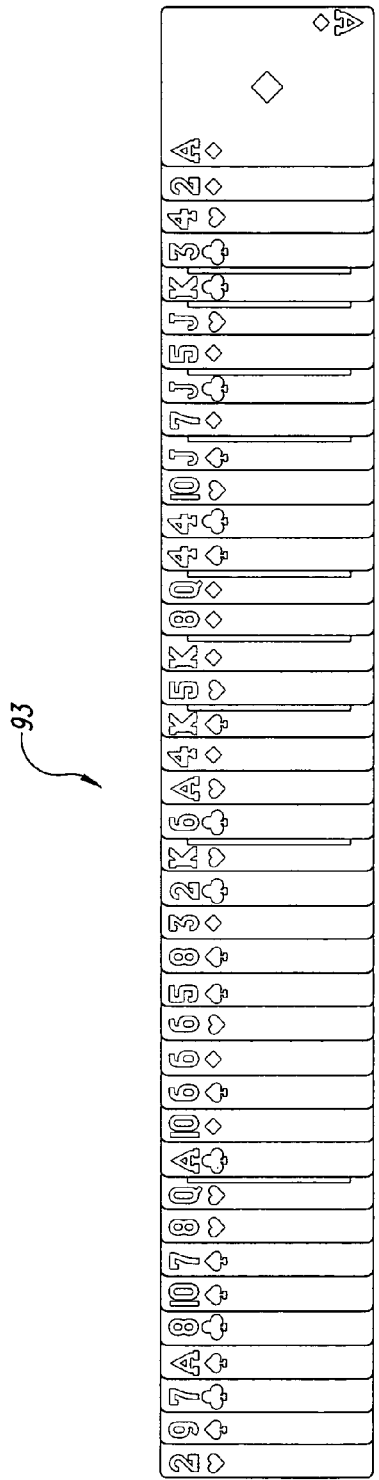
Fig. 13
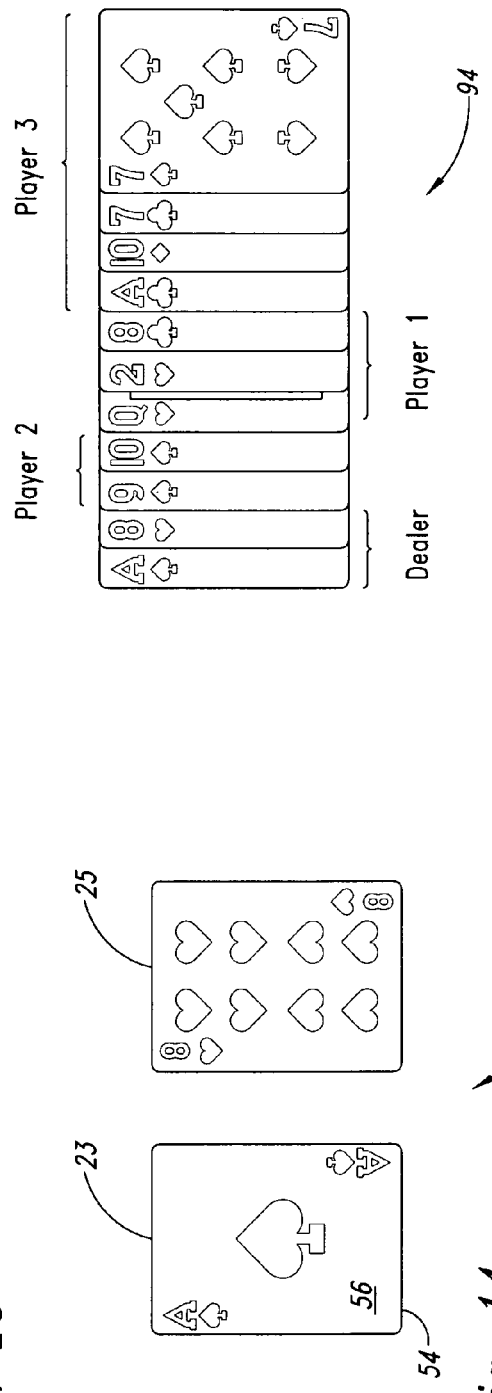
Fig. 15
Fig. 14

METHOD, APPARATUS AND ARTICLE FOR EVALUATING CARD GAMES, SUCH AS BLACKJACK

CROSS-REFERENCE TO RELATED APPLICATION

This application is a continuation of U.S. patent application Ser. No. 10/756,044, filed Jan. 13, 2004, now pending; which is a division of U.S. Pat. No. 6,685,568, issued Feb. 3, 2004.

BACKGROUND OF THE INVENTION

1. Field of the Invention

This invention is generally related to gaming, and particularly to card games, such as blackjack.

2. Description of the Related Art

Card games are a well-known form of recreation and entertainment. Games are typically played with one or more decks of cards, where each deck typically includes 52 cards. Each deck of cards will typically include four suits of cards, including: hearts, diamonds, clubs, and spades, each suit including fourteen cards having rank: 2-10, Jack, Queen, King and Ace. Card games may, or may not, include wagering based on the game's outcome.

One popular card game is known as blackjack. In blackjack, one or more players each compete against a dealer. The players attempt to collect a hand having a total value equal to, or as close to twenty-one, without going over. The value of the hand is determined by the rank of the card. Thus, cards having rank 2-10 have the value 2-10, respectively. Face cards (i.e., Jack, Queen, King) have the value 10, while Aces can have the value 1 or 10 at the player's discretion. An initial hand of two cards having the value of twenty-one (i.e., an Ace plus a ten or a face card) is referred to as a natural "21", or blackjack, and beats other hands with the value of twenty-one. Suits have no bearing on the game of blackjack.

In blackjack, the dealer will initially deal two cards to each of the players and the dealer. The dealer deals in two passes around the table, starting with players at the dealer's far left (i.e., first base) and extending through players at the dealer's far right (i.e., third base) and finally to them self. The players' cards are dealt face up in games where the cards are dealt from a shoe, and face down in hand-held games (i.e., games dealt by hand). The rules of play for the dealer are strictly dictated, leaving no decisions up to the dealer. Therefore, there is not a problem with the dealer, or any of the other players at the table, seeing the cards in a player's hand.

The dealer turns over or is dealt one of the dealer's first two cards face up, such that the value of the card is visible to the players at the table. This card is commonly referred to as the "top" card. The dealer leaves or is dealt the second card face down, such that the value of the card is not visible to the players at the table. The face down card is commonly referred to as the "hole" card. In some variations of blackjack, the dealer will immediately determine the value of the hole card, while in other variations of the game the dealer waits until all players have played their hands before checking the value of the hole card.

The dealer then offers each player in succession, from the dealer's left to right the opportunity to accept additional cards from the deck. Each player's hand is completed before the dealer offers the next player the opportunity to receive additional cards. Accepting cards is commonly referred to as "hitting" or taking a "hit." At each player's turn, the player may accept cards, one at a time, trying to build a hand with a value as close to twenty-one as possible, without going over twenty-one. The player may decline further cards at anytime, which is commonly referred to as "standing." The player must terminate play if the value of the player's hand exceeds twenty-one. A hand with a value exceeding twenty-one is commonly referred to as a "bust" or "busted." If the player busts, or has a natural twenty-one (i.e., blackjack), the dealer must complete the player's hand and place that player's cards into a discard holder. Before receiving a third card after the initial hands are dealt, a player can split the player's initial hand. This is commonly referred to as splitting. The player uses one of the initial cards to form a new hand, placing a wager for the new hand, and retains the other of the initial cards as a part of the original hand.

After each player in turn has declined to accept further cards, the dealer may accept further cards from the deck, with goal of obtaining a hand having a value as close to twenty-one as possible, without exceeding twenty-one. Casinos have rules based on the value of the dealer's hand that dictate when the dealer must take an additional card from the deck (i.e., hit) and when the player must decline further additional cards (i.e., stand). For example, many casinos require the dealer to stand if the dealer's hand has a value of seventeen or more. Some, casinos permit the dealer to take an additional card if the value of the dealer's hand is a soft seventeen, that is, if the value of the dealer's hand is seventeen by counting an Ace held by the dealer as eleven.

If the dealer busts, players who have not also busted win. If the dealer does not bust, all remaining players and the dealer must display their hands to allow the dealer to compare each of the player's hands to the dealer's hand. Those players having a hand with a higher value than the dealer's hand, and who have not exceed twenty-one win. The winning players are paid based oh the size of their wager and the odds. Blackjack includes additional rules such as "doubling down" and "insurance" bets, and other variations that are commonly known by those who play blackjack, and will not be further described in the interest of brevity.

Blackjack is particularly popular in casinos and other gaming establishments. Players wager large sums of money while playing blackjack. Thus, it is important to ensure that those playing the game are not cheating. It is also important to monitor the game in a relatively unobtrusive manner to allow casino customers to feel comfortable in their surroundings.

BRIEF SUMMARY OF THE INVENTION

In one aspect, a system reads an identifier from a hand of cards to identify the cards. For example, the system can read an identifier from a pair of cards forming the initial hand in blackjack, where one card of the pair is face up and the other card is face down.

In another aspect, a system determines the value of a hand of cards. For example, the system can determine a value of an initial hand of two cards in blackjack, while only one card is face up. In another aspect, the system can inform a dealer of the value, or status based on value of the hand.

In a further aspect, a system can determine whether cards forming a hand of cards are authentic by validating the cards based on an identifier read from each of the cards forming the hand. In yet a further aspect, a system can determine if the cards forming a hand of cards are in an expected sequence based on a knowledge of the initial sequence of cards in a deck.

BRIEF DESCRIPTION OF THE SEVERAL VIEWS OF THE DRAWINGS

In the drawings, identical reference numbers identify similar elements or acts. The size and relative positions of elements in the drawings are not necessarily drawn to scale. For example, the shapes of various elements are not drawn to scale, and some of these elements are arbitrarily enlarged and positioned to improve drawing legibility. Further, the particular shapes of elements, as drawn are not intended to convey any information regarding the actual shape of the particular elements, and have been solely selected for their ease and recognition in the drawings.

FIG. 13 is a schematic view of a portion of a deck of playing cards.

FIG. 14 is a schematic view of a dealer's initial hand of two playing cards.

FIG. 15 is a schematic view of the playing cards in the discard shoe, after playing a round of blackjack.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with cameras, optics, computers, computer networks, data structures, databases and networks such as the Internet, have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

System Environment

Figure 1:
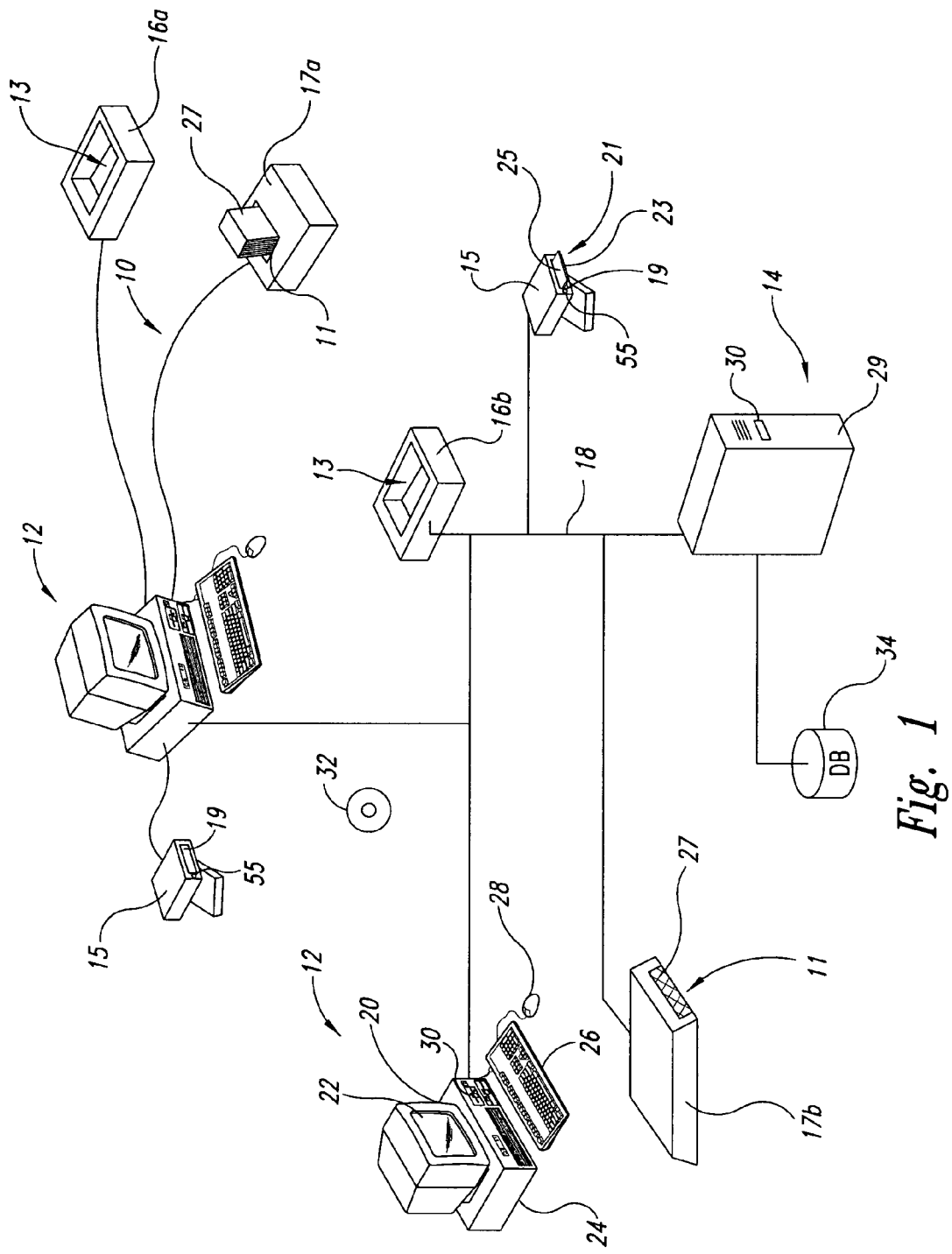
FIG. 1 is a schematic drawing showing an environment in which an embodiment of the invention can operate, including a network coupling a number of client computing systems, a server computing system, a card hand reader, and a discard shoe having a discard shoe reader.

FIG. 1 shows a card game evaluation system 10 including a number of client computing systems 12, a server computing system 14, a number of card hand readers 15, a discard shoe 16A, 16B, and a number of card deck readers 17A, 17B that communicate over a network 18. The card game evaluation system 10 and method of operation is illustrated in the environment of a blackjack game, although some components and methods are applicable to other types of card games.

The client computing systems 12 each include a display 20, screen 22, cabinet 24, keyboard 26 and mouse 28. The mouse 28 can have one or more user selectable buttons for interacting with a graphical user interface ("GUI") displayed on the screen 22. The cabinet 24 includes a slot 30 for receiving computer-readable media, such as a CD-ROM disk 32. Although the computer-readable media is represented as a CD-ROM disk 32, the card game evaluation system 10 can employ other computer-readable media, including but not limited to, floppy disks, tape, flash memory, system memory, and hard drives. The CD-ROM disk 32 can hold software applications discussed in detail below.

The server computing system 14 includes a cabinet 29 having a slot 30 for receiving computer-readable media, such as a CD-ROM disk similar to the CD-ROM disk 32. The server computing system 14 can optionally include a display, screen, keyboard, and/or mouse as described above. The server computing system 14 also includes a server database 34. The server database 34 is shown as being external to the cabinet 29 for ease of representation in the drawings, although in many embodiments the server database 34 can be located within the cabinet 29.

The card hand reader 15 has a slot 19 sized and dimensioned for receiving a hand of cards, such as the dealer's initial hand 21 which consists of the face up top card 23 and the face down hole card 25. An indicator light 55 is placed on the card hand reader 15 such that it is visible to the dealer. As described in detail in commonly assigned U.S. patent application 60/259,658, filed Jan. 4, 2001, and entitled "Method, Apparatus And Article for Verifying Card Games, Such As Blackjack," the card hand reader 15 is capable of reading an identifier associated with each of the cards 23, 25. The identifier can be encoded, for example, in a machine-readable symbol such as a bar code, or in a magnetic strip, carried by the card 23, 25. The identifier may take the form of a unique identifier, such as a serial number that uniquely identifies each card in the deck of cards, and/or the rank and/or suit of the cards 23, 25. As illustrated, the card hand reader 15 can be directly connected to one of the client computing systems 12, or can be coupled to a client computing system 12 via the network 18.

The card deck reader can take a hand-held form 17A for games dealt by hand, or can take a card shoe form 17B for games dealt from a card shoe. The hand-held card deck reader 17A includes a slot 11 sized and dimensioned to receive one or more decks of playing cards 27. The dealer can insert the deck 27 into the slot 11 prior to beginning a game. The shoe card deck reader 17B contains one or more decks of playing cards 27, and includes a slot 11 sized and dimensioned to allow the dealer to remove one card at a time. The card deck reader 17A, 17B is capable of reading a unique identifier such as a serial number, identifying each card in the deck of cards 27, and/or the rank and suit of the cards in the deck of cards 27. A similar reader is described in commonly assigned patent applications: Ser. No. 60/130,368 filed Apr. 21, 1999 and Ser. No. 09/474,858 filed Dec. 30, 1999 and entitled "Method and Apparatus For Monitoring Casino Gaming." Thus, the sequence of the cards in the deck 27 is known to the card game evaluation system 10 at the start of the game. As illustrated, the card deck reader 17A, 17B can be directly connected to one of the client computing systems 12, or can be coupled to a client computing system 12 via the network 18.

The discard shoe 16A, 16B includes a slot 13 for receiving cards collected by the dealer after the hands are completed. The discard shoe includes suitable electronics and/or optics for identifying the cards placed in the slot 13, for example by reading a unique identifier such as a serial number or the rank and suit of each card, as described in detail below.

The network 18 can take the form of any conventional network, such as one or more local area networks ("LANs"), wide area networks ("WANs"), and/or extranets, intranets, or the Internet.

Low-Level System

Figure 2:
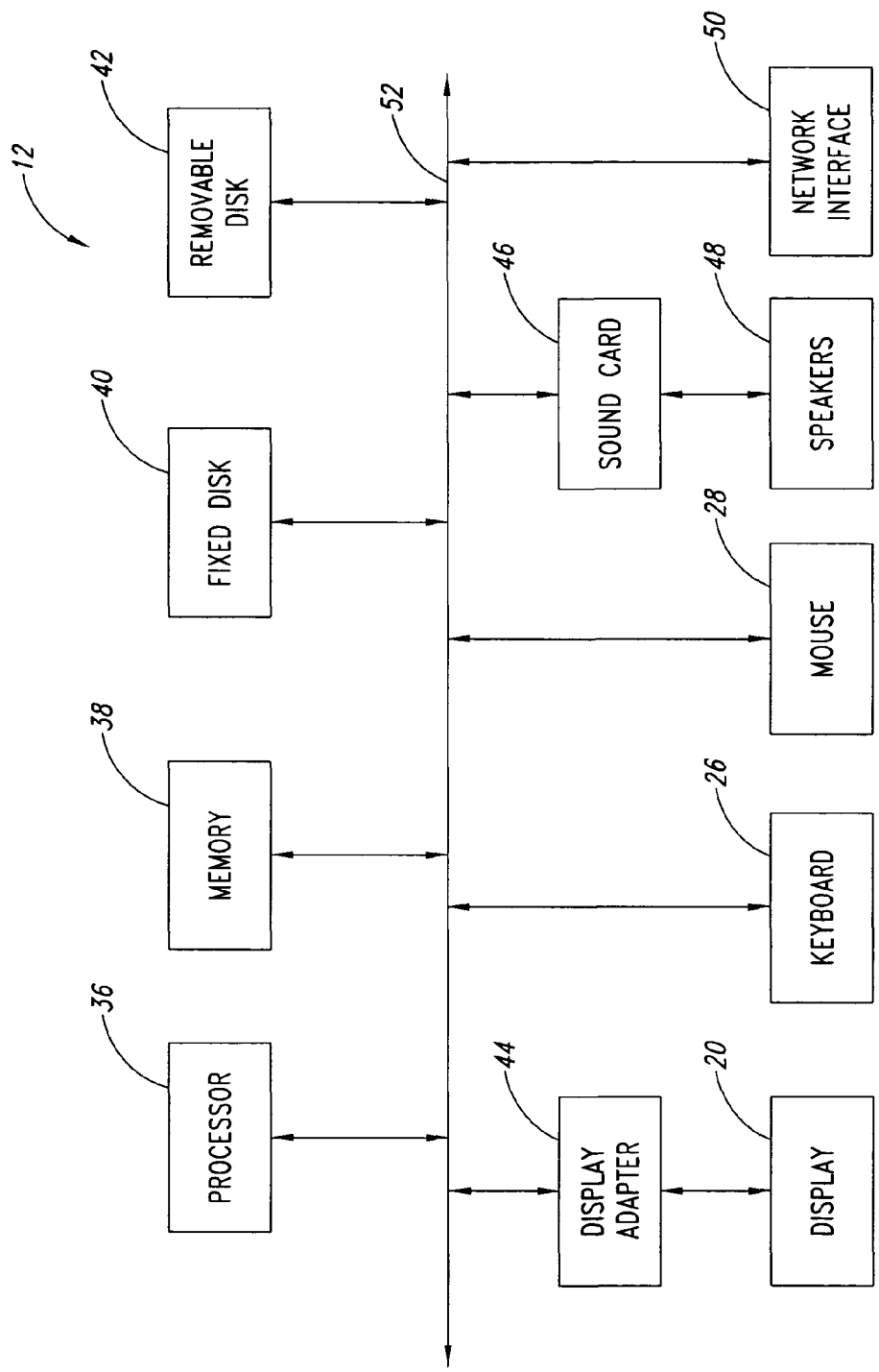
FIG. 2 is a high level system block diagram showing various hardware elements of the client computing systems of FIG. 1.

FIG. 2 shows a system block diagram of the client computing systems 12 used in executing an illustrated embodiment of the present invention. As in FIG. 1, the client computing systems 12 each include the display 20, keyboard 26 and mouse 28. Additionally, each of the client computing systems 12 can include subsystems, such as a processor 36, system memory 38, fixed persistent memory 40, media drive 42, display adapter 44, sound card 46, speakers 48, and network interface 50. Arrows 52 represent the system bus architecture of the client computing systems 12.

The client computing systems 12 can take any of a variety of forms, such as a micro- or personal computer, a mini-computer, a workstation, or a palm-top or hand-held computing appliance. The processor 36 can take the form of any suitable microprocessor, for example, a PENTIUM II, PENTIUM III, PENTIUM IV, POWER PC 603 or POWER PC 604 processor. The system memory 38 can take the form of random access memory ("RAM") or other dynamic storage that temporarily stores instructions and data for execution by the processor 36. The fixed persistent memory 40 can take the form of a hard drive or other nonvolatile computer-readable media. The media drive 42 can take the form of a CD-ROM reader, a DVD reader, an optical disk reader, floppy disk reader, or other similar device that reads instructions and/or data from computer-readable media.

While not shown in detail, the server computing system 14 can have a similar structure to the client computing systems 12, as shown in FIG. 2. In practice, the server computing system 14 will typically take the form of a network server, the details of which are commonly understood by those skilled in the art.

The computing systems 12, 14 are illustrative of the numerous computing systems suitable for use with the present invention. Other suitable configurations of computing systems will be readily apparent to one of ordinary skill in the art. Other configurations can include additional subsystems, or fewer subsystems, as is suitable for the particular application. For example, a suitable computing system 12, 14 can include more than one processor 36 (i.e., a multiprocessor system) and/or a cache memory. The arrows 52 are illustrative of any interconnection scheme serving to link the subsystems. Other suitable interconnection schemes will be readily apparent to one skilled in the art. For example, a local bus could be utilized to connect the processor 36 to the system memory 38 and the display adapter 44.

Optical Card Hand Reader

Figure 17:
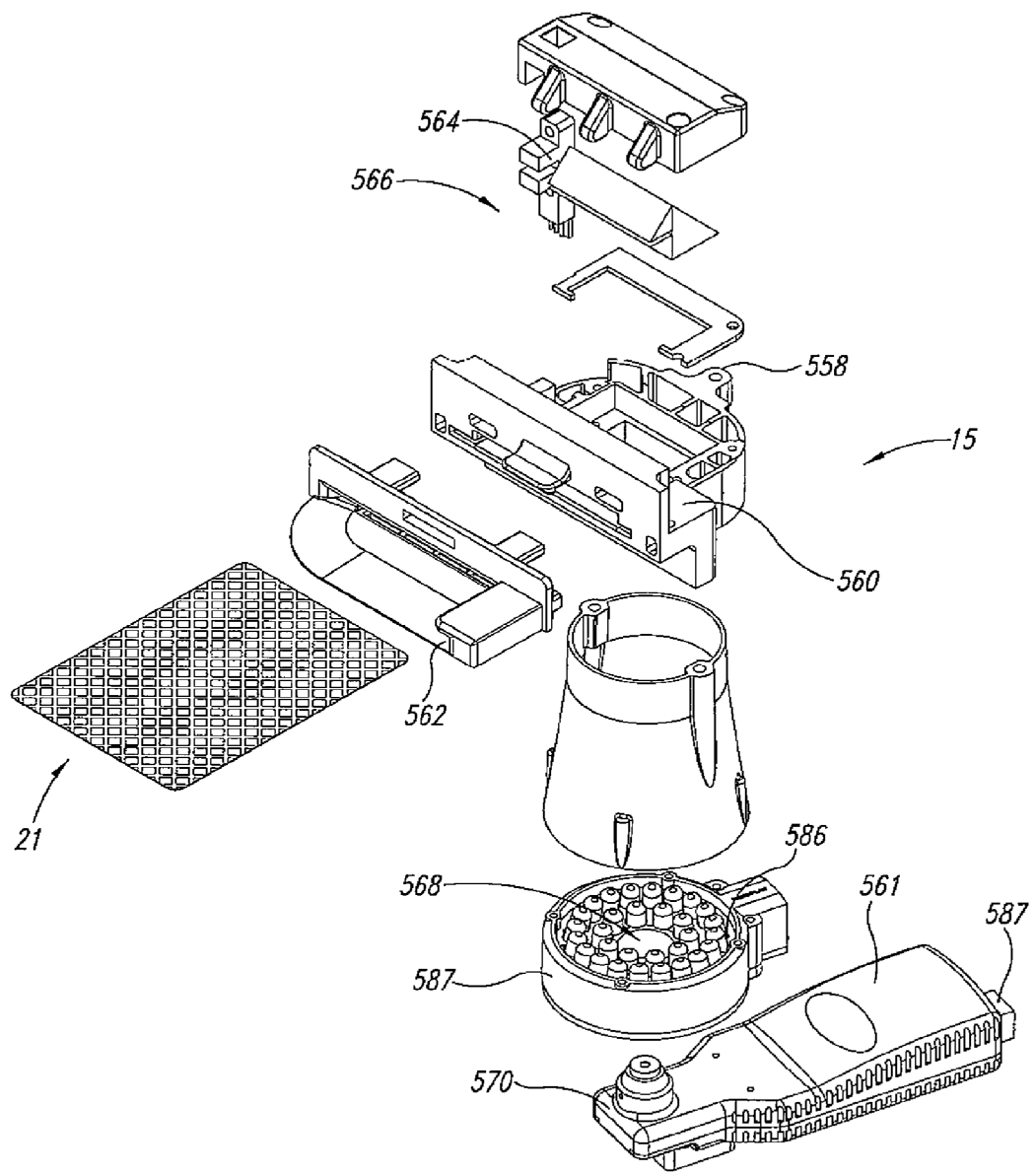
FIG. 17 is a perspective, partially exploded view of a card hand reader of FIG. 1.
Figure 18:
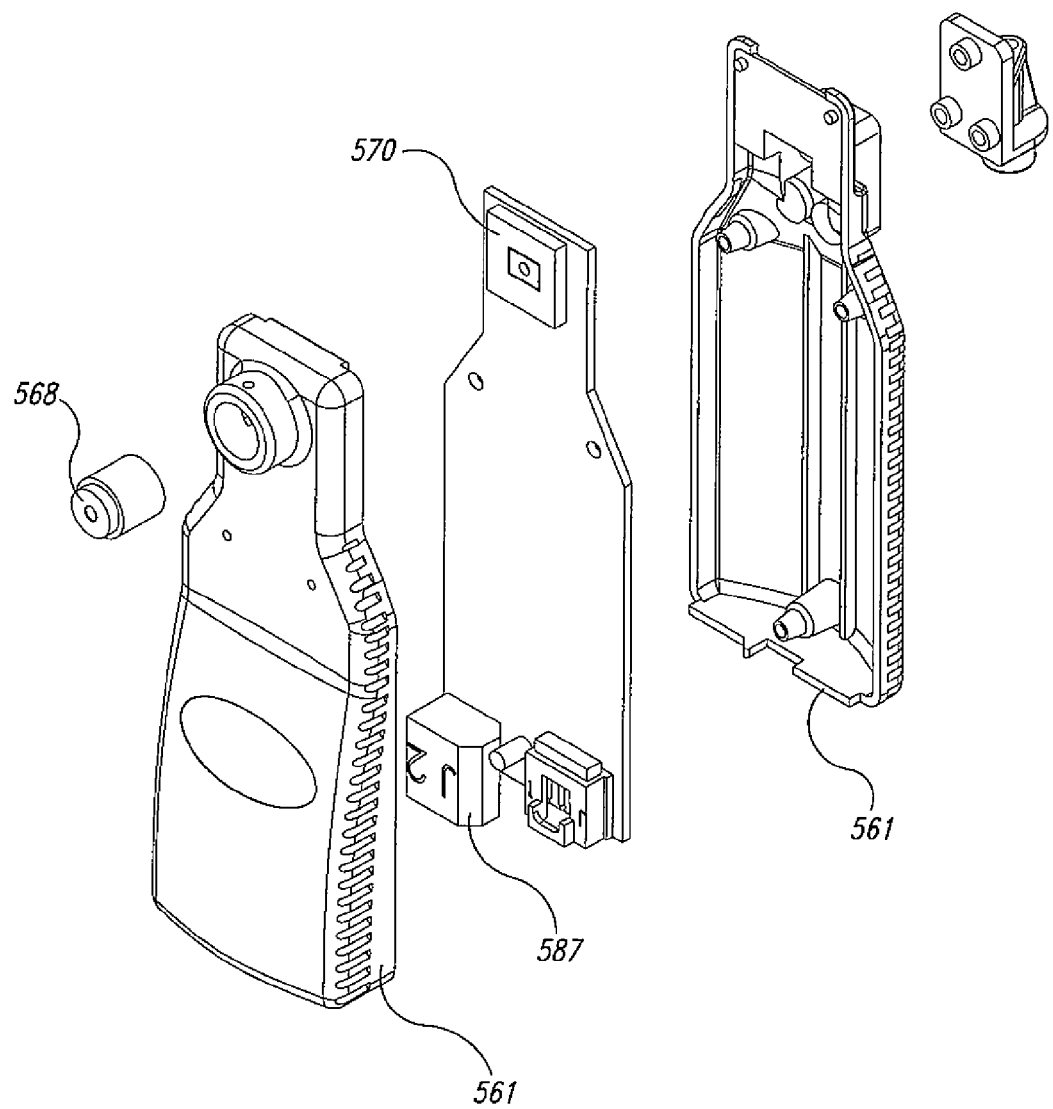
FIG. 18 is an exploded, perspective view of a portion of a card hand reader showing an optical lens assembly, imager and connector.
Figure 21:
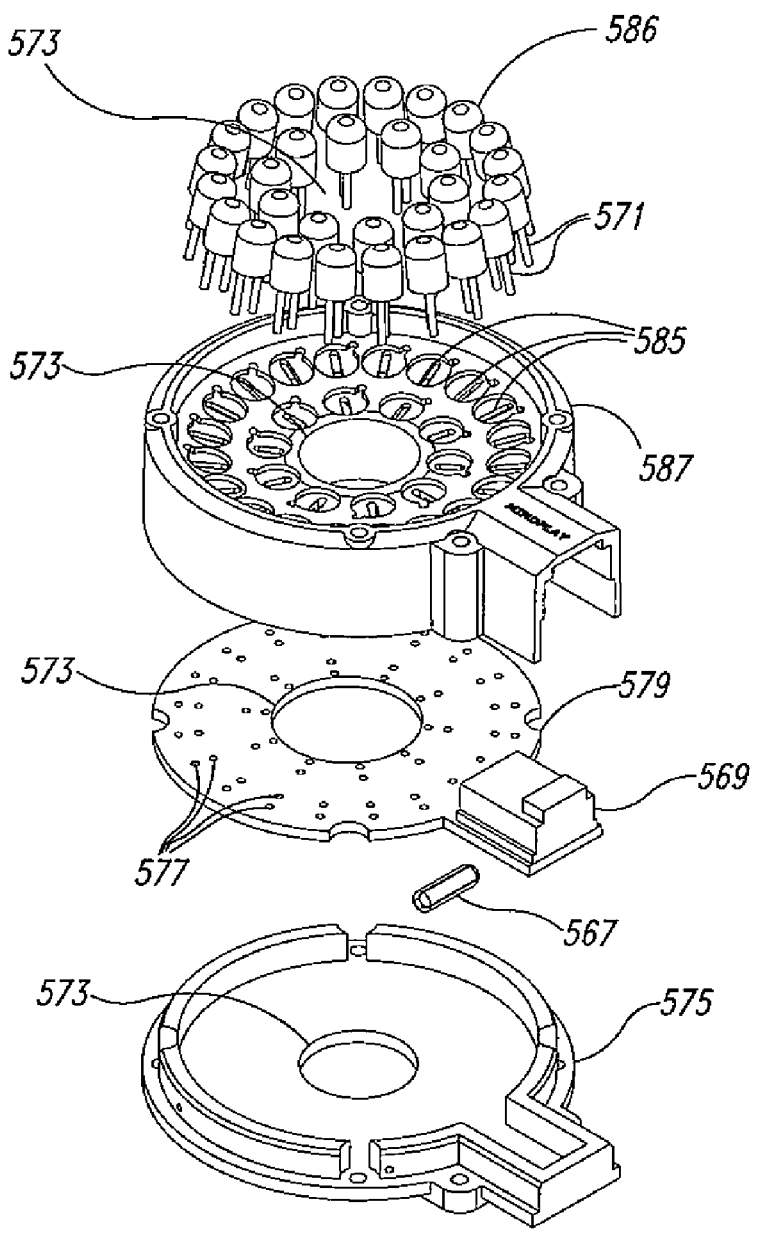
FIG. 21 is a an exploded perspective view of an illumination system for the card hand reader of FIG. 1.

FIGS. 17, 18 and 21 show the internal structure of the card hand reader 15. The card hand reader 15 reads an identifier, such as a machine-readable symbol, from the cards 23, 25. The machine-readable symbol can take any of a variety of forms, for example, a bar code symbol, or an area or matrix code symbol such as that disclosed in commonly assigned U.S. patent applications: Ser. No. 60/130,368 and Ser. No. 09/474,858.

The machine-readable symbol can be printed on an end 54 of a face 56 of the cards 23, 25. The machine-readable symbol is preferably printed such that it is not visually perceptible to humans. For example, the machine-readable symbol can be printed in an ink that is visible only under a particular wavelength of light, such as ultraviolet. Alternatively, the machine-readable symbol can be incorporated into the design on the face 56 of the card, such that the symbol blends in with the design. In a further alternative, the machine-readable symbol can be printed in a magnetic ink. The identifier is preferably printed on a back face (i.e., face without rank or suit) of the cards 23, 25. The dealer can pick up the initial hand 21, with the hole card on top of the top card, such that the front faces (i.e., faces bearing the card's rank and suit) are adjacent one another. Thus, only the back faces of the cards 23, 25 are visible when the dealer places the dealer's hand into the card hand reader 15. This reduces the chance of one of the players seeing the rank of the dealer's hole card.

A frame 58 of the card hand reader 15 includes a card guide 560 having a slot 562 sized and dimensioned for receiving the hand of cards 21. The card guide 560 ensures that the cards 23, 25 in the initial hand 21 are properly positioned with respect to a set of optical components, described below.

An optical switch 564 detects the presence of the cards when the cards are properly positioned to be imaged. The optical switch 564 can take the form of a light source, such as a light emitting diode ("LED"), and a light sensor opposed to the light source across the slot 562 in the card guide 560. The insertion of the cards 23, 25 between the light source and light sensor interrupts the reception of light by the light sensor, which acts as the switch. The hand card reader 15 can alternatively employ other switching devices, such as mechanical switches, for detecting when the cards 23, 25 are properly positioned for imaging.

The optics include a prism assembly 566, an optical lens assembly 568, and an imager 570 aligned along an optical axis. The optical lens 568 assembly can include one or more optical lenses. A 9.9 FL lens assembly available from Sunex Inc., Carlsbad, Calif., part number DSL900C, can serve as a suitable optical lens assembly 568. The imager 570 includes photo-sensitive elements, such as charged-coupled devices ("CCDs") and suitable electronics for producing a digital representation of a captured image. A CMOS color sensor, such as the CMOS color sensor available from Photobit Corporation, Pasadena, Calif., part number PB300, can serve as a suitable imager 570. The card hand reader 15 can include additional optical components, such as reflectors, defractors, splitters, polarizers, filters and lenses, where such would be suitable to the particular application. The optical axis is defined by the optical properties and position of the optical components, and is not necessarily a straight path. Many of the components can be housed in an arm 561, formed from a pair of molded plastic halves.

Figure 19:
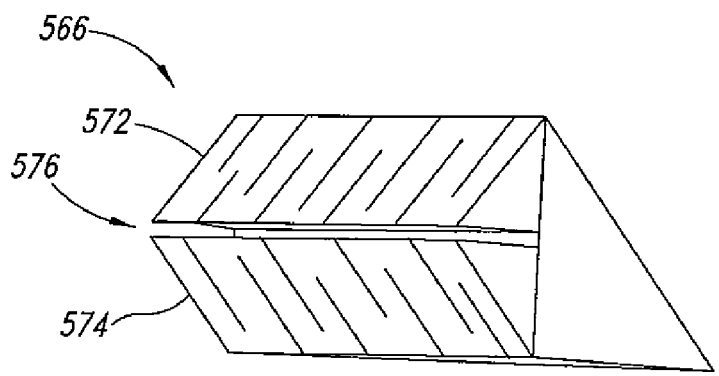
FIG. 19 is a perspective view of a prism assembly for use in the card hand reader of FIG. 17.
Figure 20:
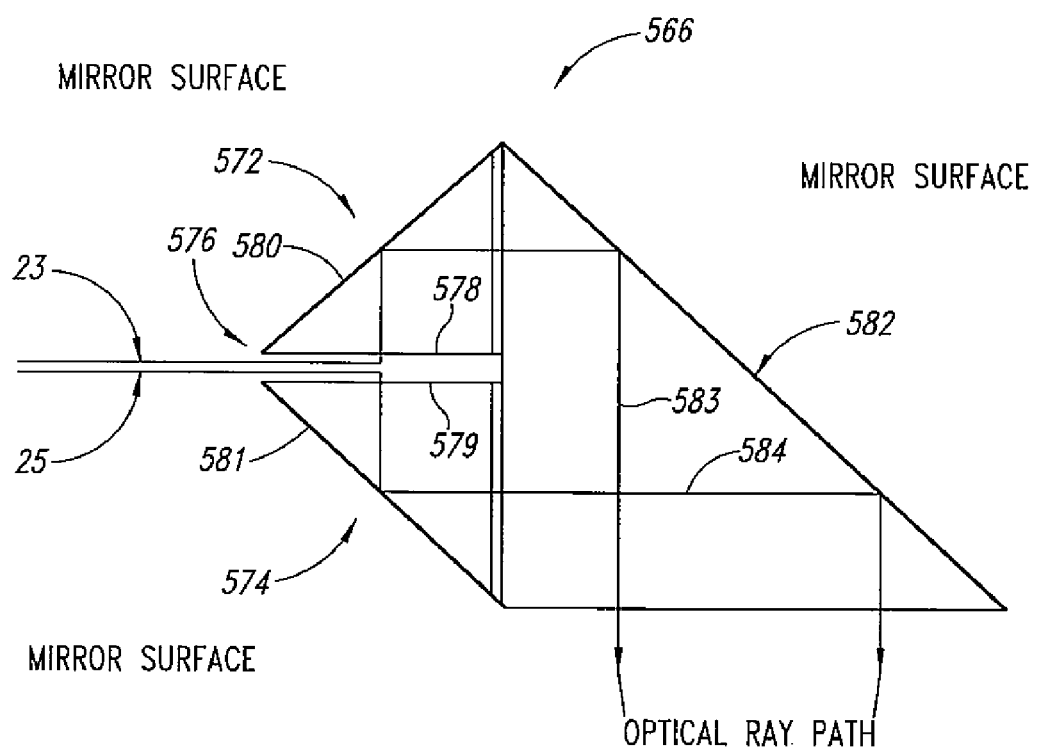
FIG. 20 is side elevation schematic view of the geometry of the prism assembly and optical path within the prism assembly.

FIGS. 19 and 20 more clearly illustrate the prism assembly 566. The prism assembly 566 includes top and bottom right angle reflecting prism portions 572, 574, respectively. A space or prism slot 576 is defined between adjacent legs 578, 579 of the top and bottom prism portions 572, 574, dimensioned to receive the cards 23, 25. The hypotenuse 580, 581 of each prism portion 572, 574, respectively, is a mirrored surface. A reflector 582 having a mirrored surface is approximately parallel to the hypotenuse 581 of the bottom prism portion 574, and perpendicular to the hypotenuse 580 of the top prism portion 572.

The optical path of the image of the top card 23 is illustrated by broken line arrow 583 (FIG. 21), while the optical path of the image of the bottom card 25 is illustrated by the broken line arrow 584 (FIG. 21). In each case, the image reflects from the hypotenuse 580, 581 of the respective prism portion 572, 574 onto the mirror surface of the reflector 582, which directs the image toward the optical lens assembly 568 and imager 570 (FIG. 17). The geometry of the optical system ensures that the image from each of the cards 23, 25 is properly focused on the imager 570 via the top and bottom prism portions 572, 574 (FIG. 17).

FIGS. 17 and 21 show the illumination system for the card hand reader 15. The card hand reader 15 includes one or more illumination sources 586 that provide low intensity illumination for the cards. The illumination sources 586 can take the form of one or more LEDs. Suitable LEDs can include ultraviolet ("UV") LEDs available from Nichia Corporation of Japan, part number NSHU590E. The illumination sources 586 are located in a base 587 of the card hand reader 15. The base 587 includes a sloped inner portion having a number of apertures 585 for receiving and aligning the illumination sources 586 to focus on the prism portions 572, 574. A printed circuit board 579 has openings 577 to receive leads 571 of the illumination sources 586. The printed circuit board 579 includes a connector 569, such as a three-pin 5V connector for providing power to the illumination sources 586. A suitable connector 568 is available from Molex Electronics, Ltd. of Canada, part number 15-91-2045. The printed circuit board 579 also includes a resistor 567, for example a 3.6 Ohm resistor.

The base 587 is mounted to a bottom 575 that allows the frame 58 (FIG. 17) to rotate about an axis with respect to the arm 561 (FIG. 17). Each of the base 587, printed circuit board 579 and bottom 575, as well as the group of illumination sources 586 has a central opening 573 for providing an unobstructed optical path between the prism portions 572, 574 and the imager 570. The illumination sources 586 produce light suitable to the particular embodiment. For example, the card hand reader 15 employs illumination sources 586 that produce predominately UV where the machine-readable symbols are only visible under UV illumination.

The card hand reader 15 is coupled to the network 18 or host computer 12 by way of a connector 587, such as a FIREWIRE connector or Universal Serial Bus ("USB") connector. For example, a FIREWIRE connector available from Molex Electronics, Ltd. of Canada, part number 52462-0611, can serve as a suitable connector 587. The connector 587 can deliver the digital representation of the captured image to the appropriate client computing system 12 for image processing and card validation.

Magnetic Card Hand Reader

Figure 22:
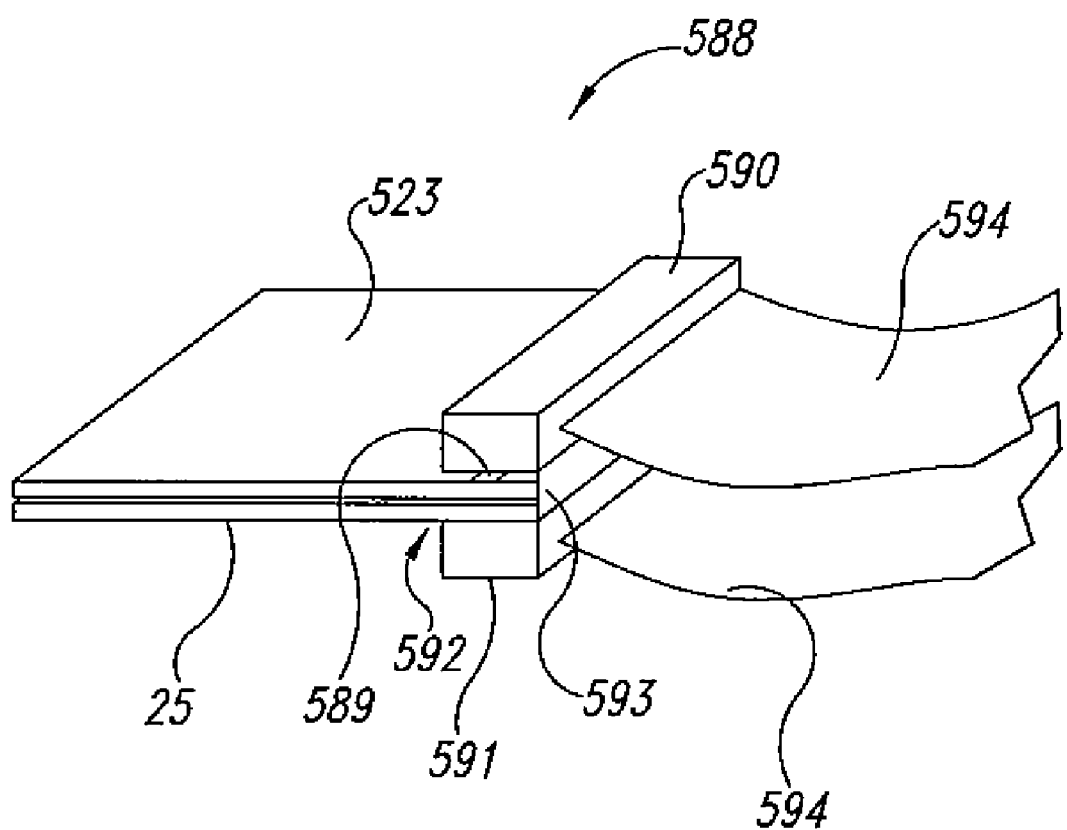
FIG. 22 is a partial perspective view of a magnetic reading head for an alternative embodiment of the card hand reader of FIG. 1.

FIG. 22 shows a magnetic head assembly 588 for use with an alternative embodiment of the card hand reader 15. The magnetic head assembly 588 is particularly useful for cards marked with a magnetic strip 589. The magnetic head assembly 588 includes a pair of opposed magnetic heads 590, 591. The magnetic heads 590, 591 are spaced apart from one another to provide a slot 592 dimensioned to closely receive the cards 23, 25. A stop 593 engages the end of the cards such that the magnetic strip 589 on the cards 23, 25 are in registration with the magnetic heads 590, 591. Cables 594 couple each of the magnetic heads 590, 591 to suitable electronics (not shown) or the connector 587 (FIG. 17) for transmitting the read magnetically encoded identification information to the network 18 (FIG. 1).

Discard Card Reader

Figure 3:
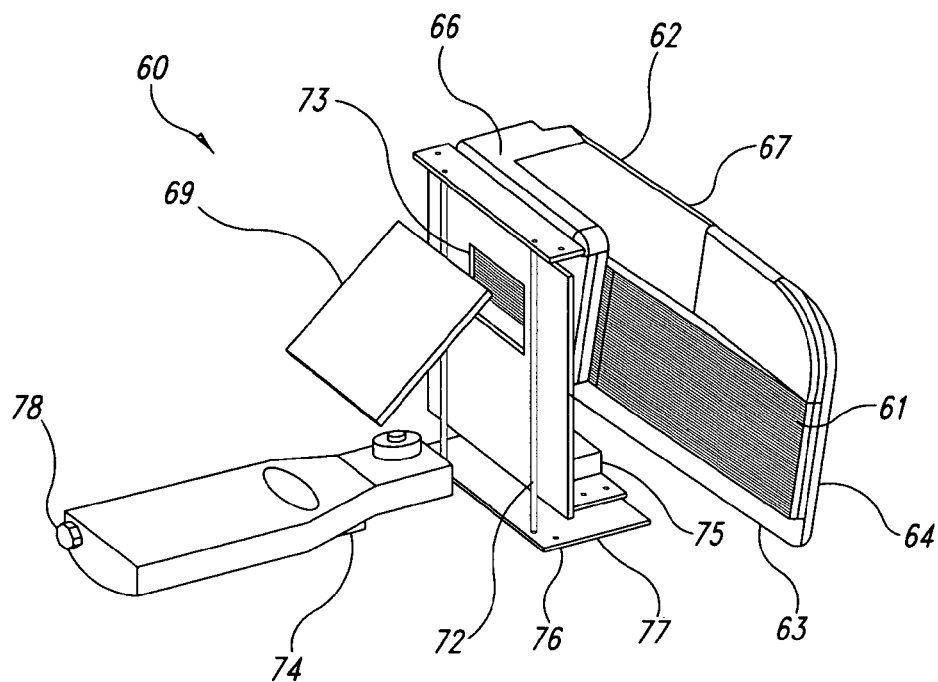
FIG. 3 is perspective view of the discard card reader of FIG. 1, showing an optical lens assembly, imager, reflector, aperture, illumination assembly and connector.
Figure 4:
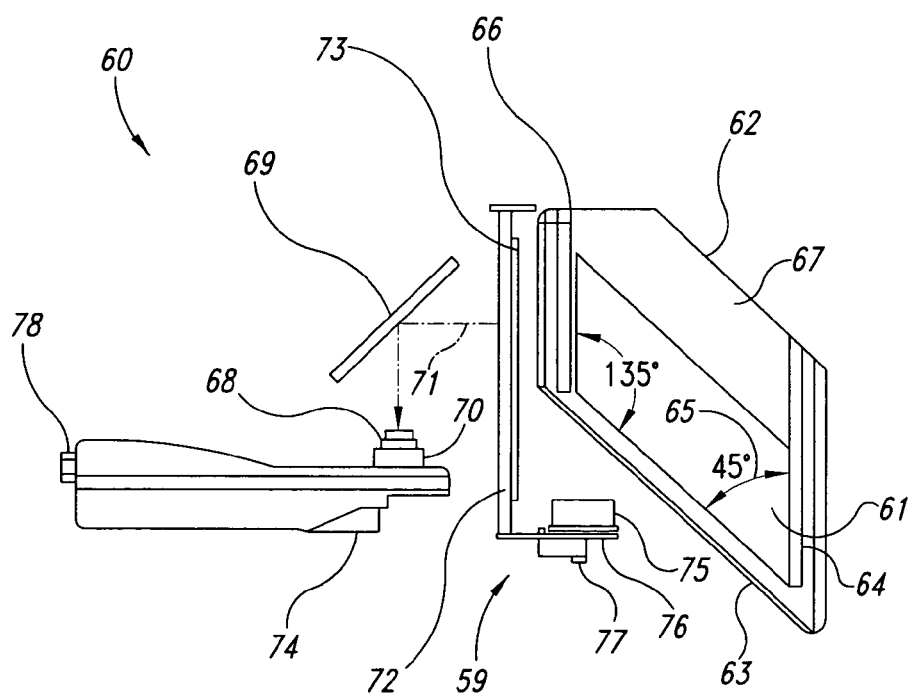
FIG. 4 is side elevation view of the discard card reader of FIG. 3.

FIGS. 3 and 4 show the structure of a discard card reader 60 which can be housed within the discard shoe 16. The discard card reader 60 reads an identifier, such as a machine-readable symbol, from the cards 61 constituting one or more completed hands. The machine-readable symbol can take any of a variety of forms, for example, a bar code symbol, or an area or matrix code symbol such as that disclosed in commonly assigned U.S. patent applications: Ser. No. 60/130,368 and Ser. No. 09/474,858.

The machine-readable symbol can be printed on an end 54 of a face 56 of the cards 21 (shown in FIG. 14). The machine-readable symbol is preferably printed such that it is not visually perceptible to humans. For example, the machine-readable symbol can be printed in an ink that is visible only under a particular wavelength of light, such as ultraviolet. Alternatively, the machine-readable symbol can be incorporated into the design on the face 56 of the card, such that the symbol blends in with the design. In a further alternative, the machine-readable symbol can be printed in a magnetic ink. The identifier is preferably printed on a front face (i.e., face with rank and suit indicia) of the cards 61.

A card guide 62 holds the cards 61 and ensures that the cards 61 are properly positioned with respect to a set of reading components, such as electronics and optical components, described below. The card guide 62 includes a card support surface 63. The card support surface 63 is sloped with respect to a base of the discard shoe 16 (FIG. 1), to hold the cards 61 in the discard shoe 16 such that the cards 61 are slightly shifted or staggered with respect to adjacent cards (as shown in FIGS. 3 and 4) when the discard shoe 16 is on the horizontal playing surface 31 of the gaming table (not shown). A bottom end wall 64 supports the cards 61 on the sloped card support surface 63, and forms an acute angle 65 therewith. An angle 65 of approximately 45 degrees is suitable. A top end wall 66 is transparent, or has a window formed therein, to expose the ends 54 of the faces 56 of the cards 61 in the card guide 62. Side walls 67 help ensure the cards 61 are properly aligned to form a stack within the card guide 62.

The reading electronics and optics can include an optical lens assembly 68, a reflector 69, and an imager 70 aligned along an optical path illustrated by broken line arrow 71. The optical lens assembly 68 can include one or more optical lenses and filters. For example, a 9.9 FL lens assembly available from Sunex Inc., Carlsbad, Calif., part number DSL900, can serve as a suitable optical lens. Also for example, the optical lens assembly 68 can include a narrow band pass filter that passes light having a wavelength of approximately 450 nanometers, while stopping other light, such as light coming directly from an illumination source 72. A suitable filter is available from Edmond Scientific, of Barrington, N.J., as part number 00151-11859.

The imager 70 includes photo-sensitive elements, such as charged-coupled devices ("CCDs") and suitable electronics for producing a digital representation of a captured image. A CMOS color sensor, such as the CMOS color sensor available from Photobit Corporation, Pasadena, Calif., part number PB300, can serve as a suitable imager 70.

The reflector 69 can be positioned at an angle, such as a 45 degree angle, to the top end wall 66 and the imager 70 to pass an image of the ends 54 of the cards 61 to the imager 70. The discard card reader 60 can include additional optical components, such as reflectors, defractors, splitters, polarizers, filters and lenses, where such would be suitable to the particular application. For example, the discard card reader 60 can include an aperture 73 between the reflector 69 and the top end wall 66, which can improve the field of depth of the imager 70. The optical path 71 is defined by the optical properties and position of the optical components, and thus does not necessarily have to be a straight line. Many of the components can be housed in an arm 74, formed from a pair of molded plastic halves.

The discard card reader 60 includes an illumination system 59 having one or more illumination sources 72 that provide low intensity illumination for the cards 61. The illumination sources 72 can take the form of one or more lamps. The illumination sources 72 produce light suitable to the particular embodiment. For example, the discard card reader 60 can employ illumination sources 72 that produce predominately UV light where the machine-readable symbols are only visible under UV illumination. Suitable lamps can include ultra-violet ("UV") lamps available from JKL Components Corporation of Pacoima, Calif., as part number BF350-UV1, having a diameter of 3 millimeters and a length of 50 millimeters. The illumination sources 72 are located proximate the top end wall 66 of the card guide 62. The illumination sources 72 receive power from a high voltage power inverter 75 via a printed circuit board 76 that receives power from a 5V power source 77. A suitable high voltage power inverter is available from JKL Components Corporation as part number BXA 501A.

The discard card reader 60 is coupled to the network 18 or host computer 12 by way of a connector 78, such as a FIREWIRE connector or Universal Serial Bus ("USB") connector. For example, a FIREWIRE connector available from Molex Electronics, Ltd. of Canada, part number 52462-0611, can serve as a suitable connector 78. The connector 78 can deliver the digital representation of the captured image to the appropriate client computing system 12 for image processing and card validation.

Figure 5:
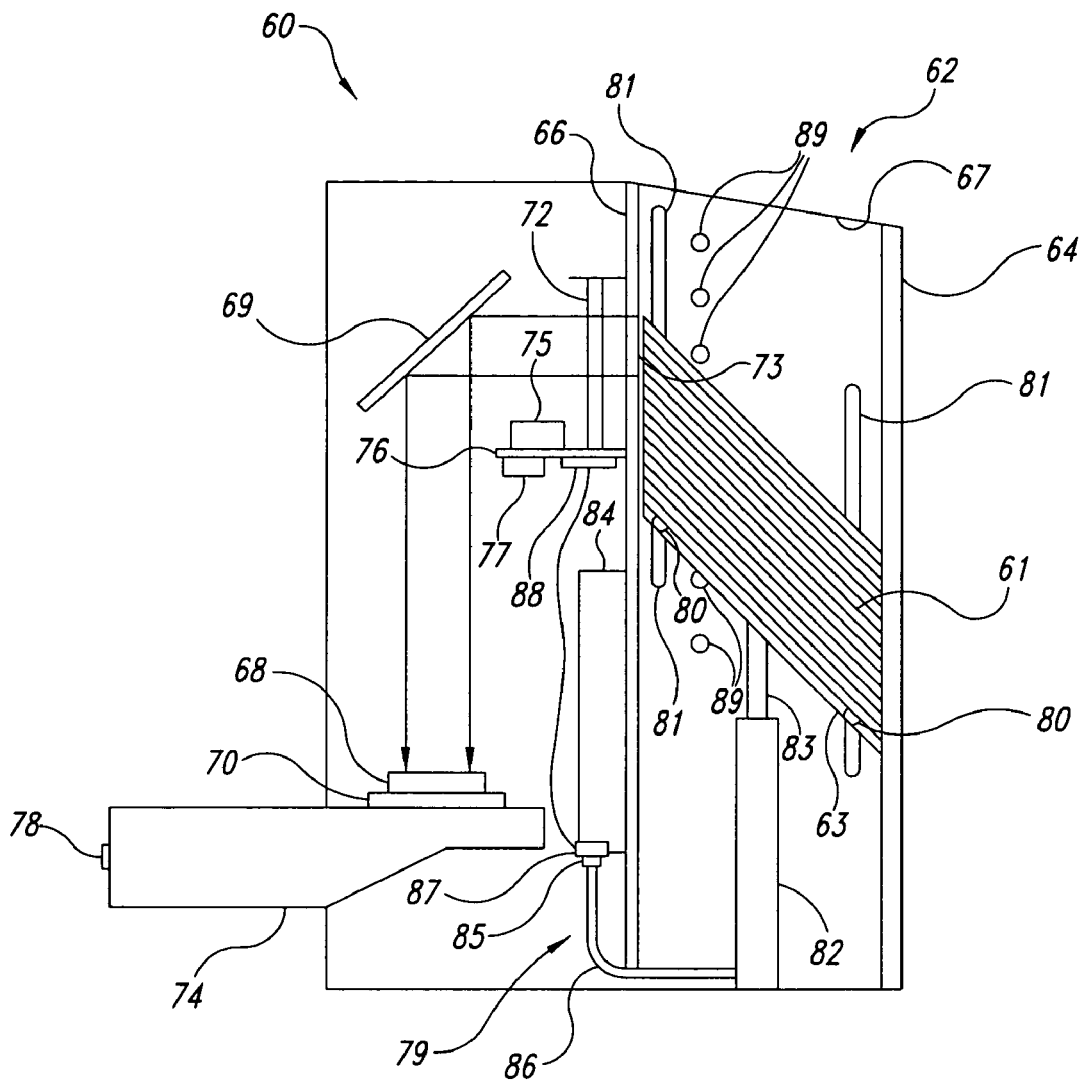
FIG. 5 is side elevation view of an alternative discard card reader, including an actuator for moving the cards relative to an aperture.

FIG. 5 shows an alternative embodiment of the discard card reader 60, that is suitable for reading large numbers of cards (e.g., two to six decks). This alternative embodiment, and those alternative embodiments and other alternatives described herein, are substantially similar to previously described embodiments, and common acts and structures are identified by the same reference numbers. Only significant differences in operation and structure are described below.

The embodiment shown in FIGS. 3 and 4 is particularly suited for reading up to two decks of cards, the imager 70 typically having a field of view encompassing up to two decks. The embodiment of FIG. 5 has a similar field of view and moves field of view relative to the cards to incrementally read all of the cards in the discard shoe 16.

The discard card reader 60 employs an actuator, such as a jack screw or a hydraulic actuator 79, to incrementally move the cards past the field of view of the imager 70. The actuator 79 moves the card support surface 63 to incrementally pass the cards 61 by the aperture 73. The card support surface 63 is slidably mounted with respect to the bottom end wall 64, top end wall 66 and side walls 67. The card support surface 63 can include a number of tabs 80 which fit in grooves 81 formed in the side walls 67 to guide the card support surface 63 as it advances upward and downward in the card guide 62. The tops and bottoms of the grooves can serve as stops to limit the travel of the card support surface 63. The discard card reader 60 can, of course, employ other guide mechanisms, or may function without such a mechanism. While the illustrated embodiment shows the actuator 79 moving the cards 61, other embodiments can move the reflector 69, imager 70, and/or one or more of these components to sweep the field of view of the imager 70 across all of the cards 61 in the card guide 62.

The hydraulic actuator 79 includes a cylinder 82 and piston 83, which is moved relative to the cylinder 82 by controlling the pressure within the cylinder 82 via a reservoir 84, valve 85 and conduit 86. The discard card reader 60 can of course employ other types of actuators 79 The valve 85 is operated by a solenoid 87 that is controlled via a processor, such as a microprocessor 88 mounted on the circuit board 76.

The discard card reader 60 includes one or more position sensors 89 that detect the position of the card support surface 63, the piston 83, or the cards 61 to determine the height of cards in the card guide 62. This allows the microprocessor 88 to activate the solenoid to adjust the level of the card support surface 63 so that the cards are properly positioned with respect to the aperture 73 to be imaged. The position sensors 89 can take the form of optical switches, mechanical switches, or magnetic switches. For example, an optical switch can take the form of a light source, such as a light emitting diode ("LED"), and a light sensor opposed to the light source across the card guide 62. The insertion of the cards 61 between the light source and light sensor interrupts the reception of light by the light sensor, that acts as the switch. Also for example, a conductor mounted on, or forming a part of, the card support surface 63 can contact one of a number of conductors on the side walls 67 to close a circuit, providing an indication of the position of the card support surface 63, and hence the position of the cards 61. Similarly, a magnet mounted on the card support surface 63 or piston 83 can pass one of a number of magnetic sensors such as a reed switch to provide position information to the microprocessor 88.

The discard card reader 60 incrementally reads groups of cards. The microprocessor 88 can be programmed to advanced the cards in set increments, for example ¼ inch increments, past the aperture 73. The microprocessor employs the position of the cards 61 as a trigger for advancing the cards. For example, a signal from a single position sensor 89 positioned above the aperture 73 can indicate that there are cards 61 in the card guide 62 that have not been read. The microprocessor 88 advances the cards by activating the solenoid 87 to open and close the value 85 to the reservoir 84, thereby controlling the flow of a fluid, such as air, into the cylinder 82. The discard card reader 60 can employ other methods of positioning the cards, for example turning a jack screw coupled to the card support surface 63.

Magnetic Discard Card Reader

Figure 6:
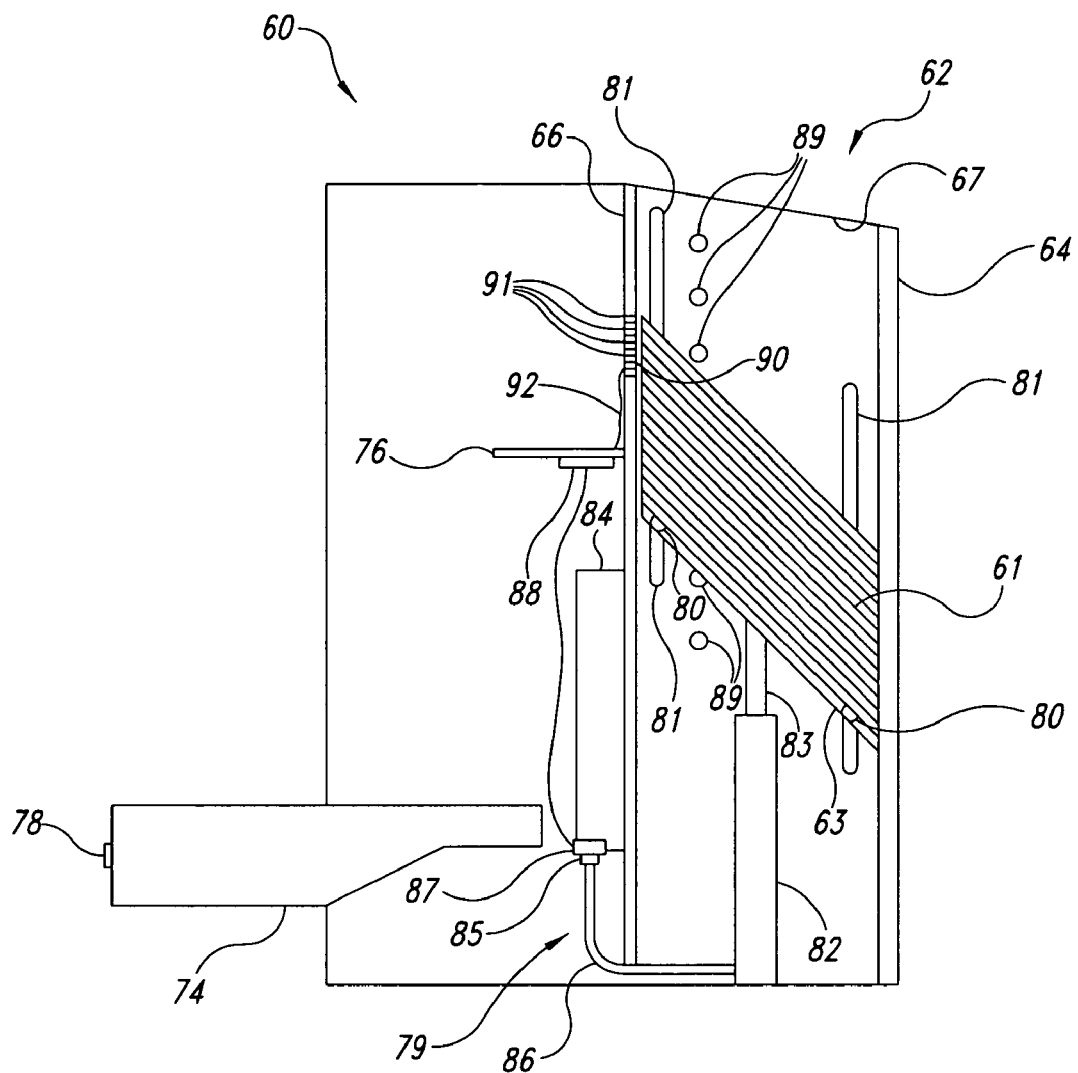
FIG. 6 is side elevation view of an alternative discard card reader, including a magnetic reading head for reading magnetic markings on the cards.

FIG. 6 illustrates a further alternative embodiment, in which the discard card reader 60 can employ a magnetic head assembly 90 for reading cards marked with a magnetic strip. The magnetic head assembly 90 can include one or more magnetic heads 91, positioned in the aperture 73 closely spaced from the ends 54 of the cards 61. The magnetic heads 91 read the information encoded in the magnetic strips as the cards are successively incremented past the magnetic head assembly. Cables 92 couple each of the magnetic heads to the circuit board 76.

Software

Figure 7:
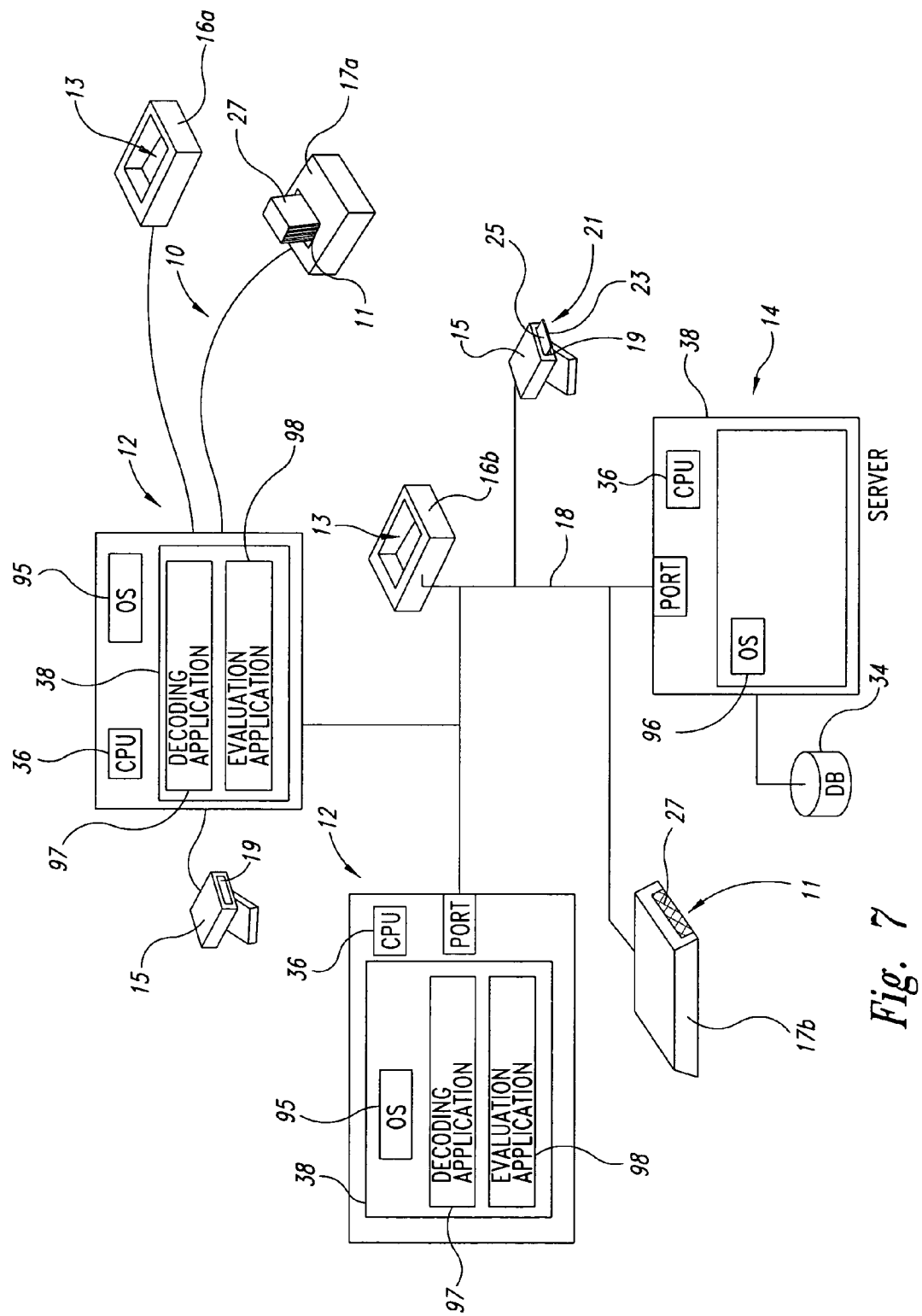
FIG. 7 is a schematic drawing showing the environment of FIG. 1, including a number of software applications loaded into memory on the client and server computing systems.

As shown in FIG. 7, the system memory 38 of the client computing system 12 and server computing system 14 contain instructions and data for execution by the respective processors 36 for implementing the illustrated embodiments. For example, the system memory 38 includes an operating system ("OS") 95, 96 to provide instructions and data for operating the respective computing systems 12, 14. In the case of the client computing systems 12 the OS 95 can take the form of conventional operating systems, such as WINDOWS 95, WINDOWS 98, WINDOWS NT 4.0 and/or WINDOWS 2000, available from Microsoft Corporation of Redmond, Wash. In the case of the server computing system 14, the OS 96 can take the form of conventional server operating systems, such as WINDOWS NT 4.0 Server, and/or WINDOWS 2000 Server, also available from Microsoft Corporation. The OS 95, 96 can include application programming interfaces ("APIs") (not shown) for interfacing with the various subsystems and peripheral components of the computing systems 12, 14, as is conventional in the art. For example, the OS 95, 96 can include APIs for interfacing with a display subsystem 20, 44, keyboard 26, sound subsystem 46, 48 and communications or network subsystem 50.

The system memory 38 of the client and server computing systems 12, 14 can also include additional communications or networking software (not shown) for wired and/or wireless communications on networks, such as local area networks ("LANs"), wide area networks ("WANs"), or the Internet. For example, the client computing system 12 can include a Web client or browser for communicating across the World Wide Web portion of the Internet using standard protocol (e.g., Transportation Control Protocol/Internet Protocol ("TCP/IP"), User Datagram Protocol ("UDP")). A number of Web browsers are commercially available, such as NETSCAPE NAVIGATOR from America Online, and INTERNET EXPLORER available from Microsoft of Redmond, Wash.

The server computing system 14 can include a Web server, such as any of the many commercially available Web server applications.

The system memory 38 of the client computing system 12 includes instructions and/or data in the form of a decoding application 97 for resolving the digital image into machine-readable symbols and converting the machine-readable symbols into their respective identifiers and/or ranks and suits. Software for resolving digital images into machine-readable symbols and converting the machine-readable symbols into identifiers is commonly known in the automatic data collection ("ADC") arts. The system can additional, or alternatively, include other software for reading and converting other types of identifiers, such a magnetic strips.

The system memory 38 of the client computing system 12 also includes instructions and/or data in the form of an evaluation application 98 for determining the value and/or status of the hand (e.g., blackjack or not). The evaluation application 98 also can authenticate the cards in the hand (i.e., determine that the cards belong to the deck being played), and validate the sequence of the cards comprising the hand with respect to a known sequence of cards for the deck (i.e., no cards missing or inserted).

Overall Method

Figure 8:
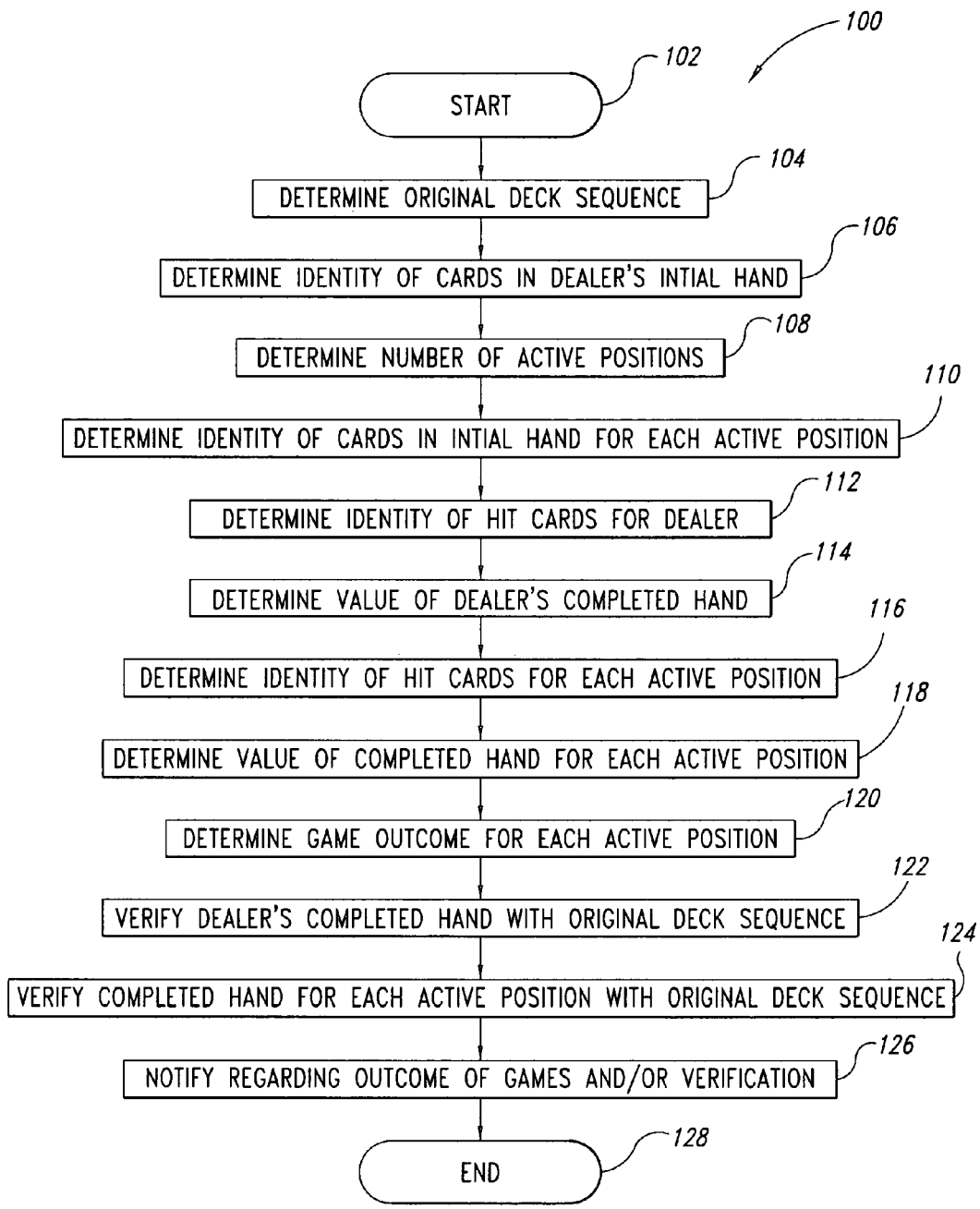
FIG. 8 is a flow diagram of an overview of an illustrated method of operating the card game evaluation system of FIG. 1.

FIG. 8 shows an overview of an illustrated method 100 of operating the card game evaluation system 10. Additional flow diagrams (FIGS. 9-12) illustrate more detailed aspects of the operation of the card game evaluation system 10, as well as actions of the dealer employing the game evaluation system 10.

The method 100 starts at step 102, for example in response to the insertion of a deck of cards into the deck reader. In step 104, the card game evaluation system 10 determines the original sequence of cards in the deck. In step 106, the card game evaluation system 10 determines the identity of the cards in the dealer's initial hand. In step 108, the card game evaluation system 10 determines the number of active player positions (i.e., hands being played). In step 110, the card game evaluation system 10 determines the identity of the cards in the initial hand for each of the active positions. In step 112, the card game evaluation system 10 determines the identity of the hit cards for the dealer. In step 114, the card game evaluation system 10 determines the value of the dealer's complete hand. In step 116, the card game evaluation system 10 determines the identity of the hit cards for each active position. In step 118, the card game evaluation system 10 determines the value of the completed hands for each active position. It is noted that step 114 can follow step 116 and/or step 118. In step 120, the card game evaluation system 10 determines the outcome of the game for each active position. In step 122, the card game evaluation system 10 verifies the dealer's completed hand against the original deck sequence. In step 124, the card game evaluation system 10 verifies the completed hand against the original deck sequence for each of the active positions. It is noted that steps 114 and/or step 118 can follow steps 122 and/or step 124. In step 126, the card game evaluation system 10 notifies the dealer and/or other casino personnel of the outcome of the games for each of the active positions and of the outcome of the verification, if any. The method 100 terminates at step 128.

Figure 9:
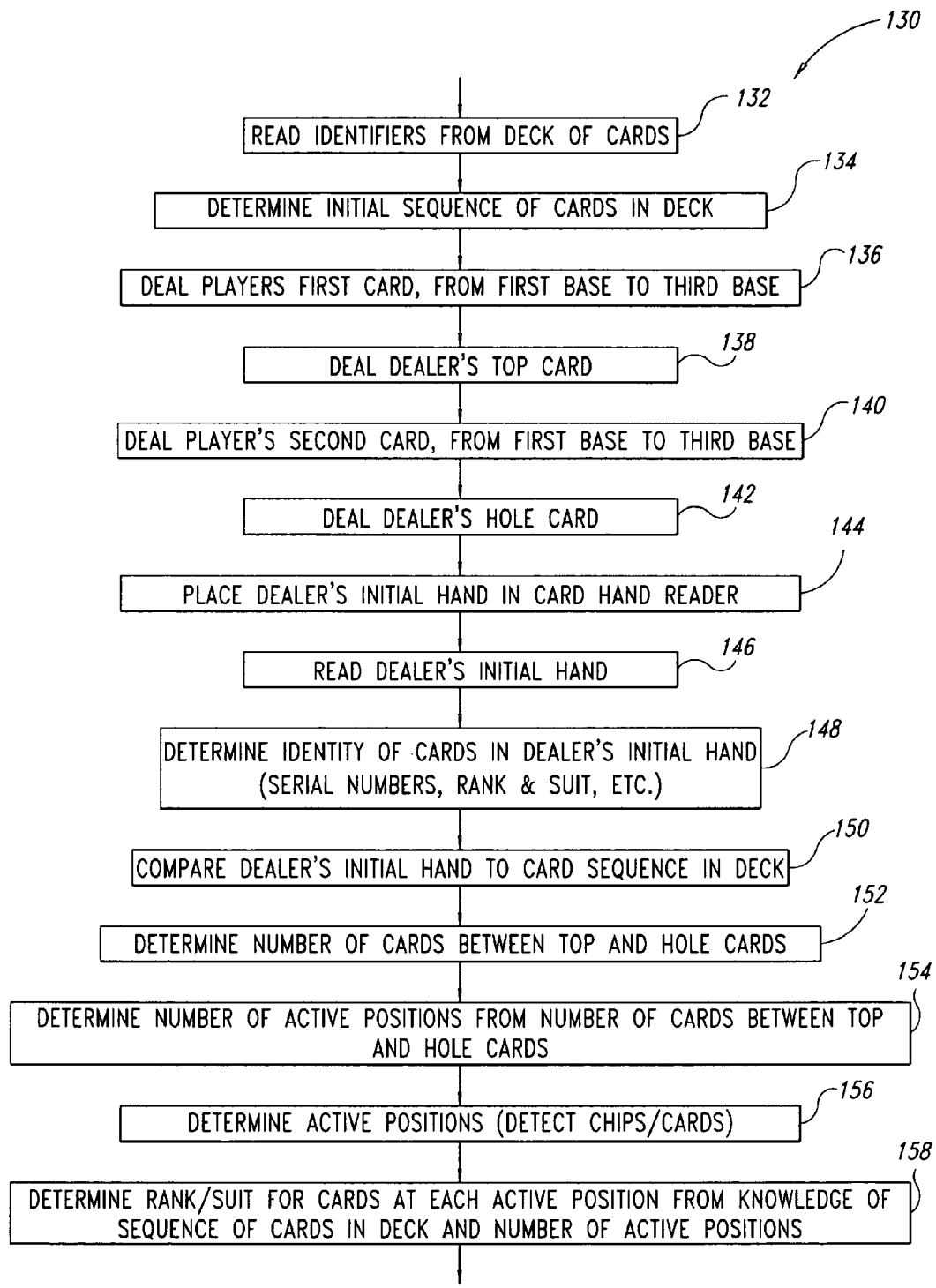
FIG. 9 is a flow diagram of an illustrated method of operating a blackjack game including operating the card game evaluation system of FIG. 1 to identify the sequence of the deck and the initial hands of the dealers and players.

FIG. 9 shows an exemplary method 130 of operating in the gaming environment of blackjack. In particular, method 130 identifies specific acts by the card game evaluation system 10 and the dealer. In overview, the method 130 includes: first, determining the sequence of cards in the deck; second, dealing each player and the dealer their respective initial hands;

third, determining the value of the dealer's initial hand; and fourth, determining the value of all active hands.

In step 132, the card deck reader 17A, 17B reads identifiers from each of the cards composing the deck of cards. A suitable deck reader is disclosed in commonly assigned U.S. patent application Ser. No. 09/474,858, filed Dec. 30, 1999, entitled "Method and Apparatus For Monitoring Casino Gaming." In step 134, the card game evaluation system 10 determines the initial sequence of the cards in the deck of cards based on the identifiers read by the card deck reader 17A, 17B.

In step 136, the dealer deals a first card to each player. As explained above the dealer may deal by hand or may deal from a card shoe. The dealer deals to each player starting from the dealer's left (i.e., first base) to the dealer's right (i.e., third base). In step 138, the dealer deals herself a top card. In step 140, the dealer deals a second card to each player, again from first base to third base. In step 142, the dealer deals herself a hole card.

In step 144, the dealer places the dealer's initial hand (i.e., top card and hole card) into the card hand reader 15 for reading. In step 146, the card hand reader reads the dealer's initial hand as explained in U.S. patent application Ser. No. 60/130,368. In step 148, the card game evaluation system 10 determines the identity of cards in the dealer's initial hand. As explained above, the card game evaluation system 10 can rely on a machine-readable symbol such as a bar code or magnetic strip encoding a serial number of the suit and rank of the card read by the card hand reader 15.

In step 150, the card game evaluation system 10 compares the dealer's initial hand to the card sequence in the deck.

In step 152, the card game evaluation system 10' determines the number of cards between the top and hole cards. The card game evaluation system 10 determines the number of active positions in step 154, from the number of cards between the top and hole cards. In step 156, the card game evaluation system 10 can determine the active positions at the gaming table, for example by detecting the location of cards and/or chips, as described in commonly assigned patent application.

In step 158, the card game evaluation system 10 determines the rank and suit for cards (i.e., players' initial hands) at each of the active positions based on the knowledge of the sequence of cards in the deck and the number of active positions.

Figure 10A:
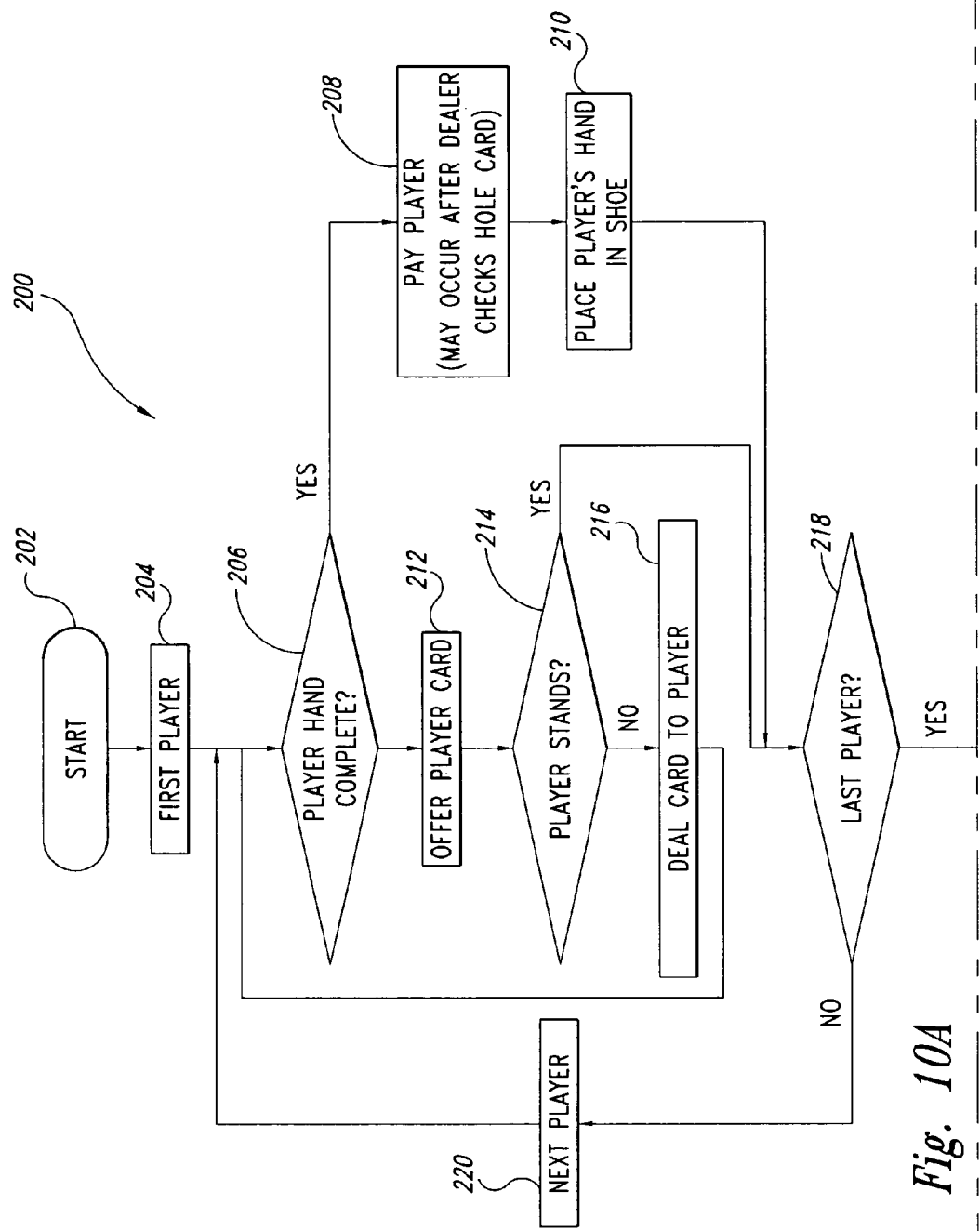
FIGS. 10A and 10B are a flow diagram of an illustrated method of operating a blackjack game including dealing and collecting cards after the initial hands have been dealt and read according to the method of claim 8.
Figure 10B:
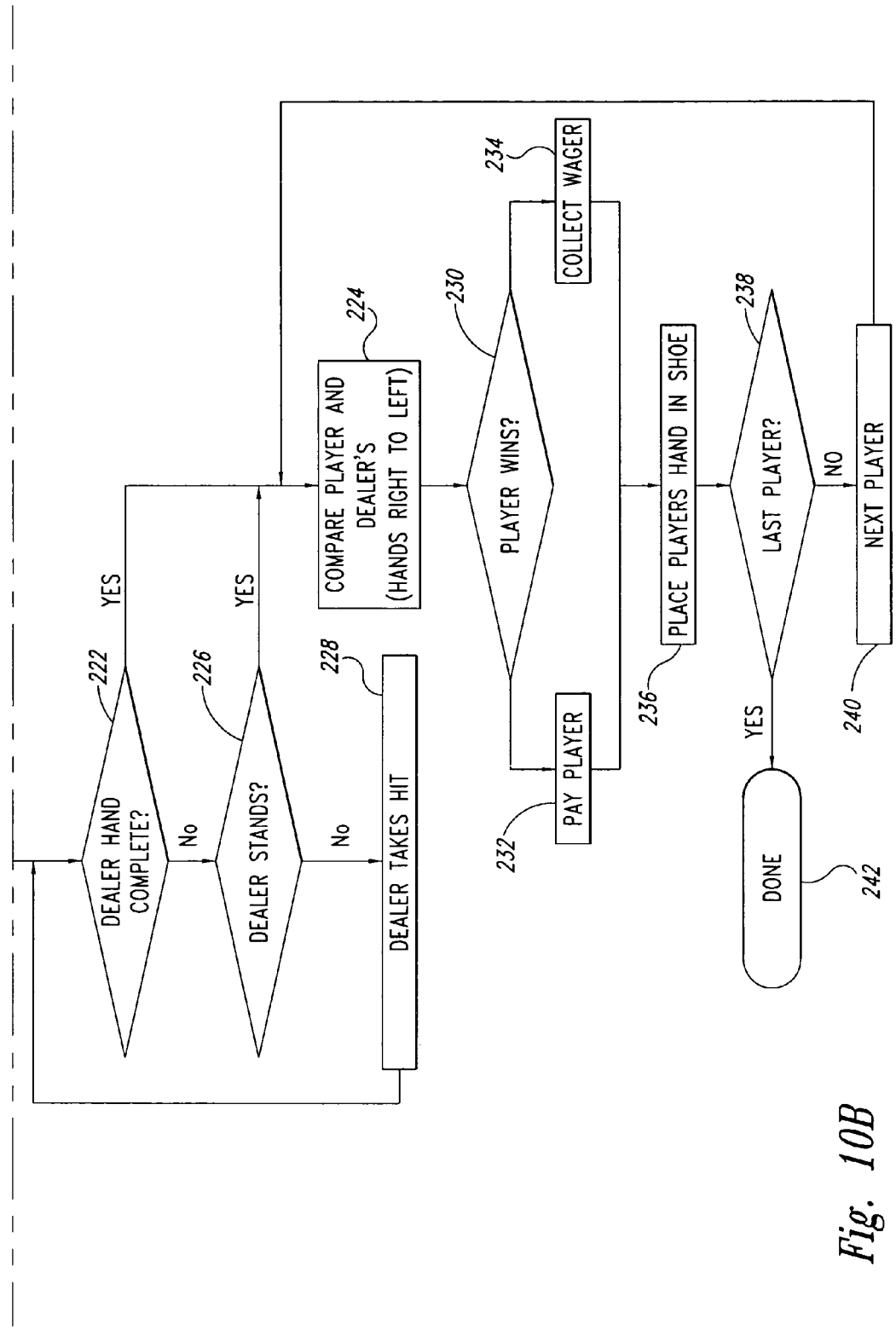

FIGS. 10A and 10B show a method 200 of operating a blackjack game, in particular the method 200 identifies specific acts by the dealer after the initial hands have been dealt, and would typically follow the acts of method 100.

In step 202, the dealer selects a first player. The first player is the player at the first base position. In step 204, the dealer determines whether the player's hand is complete. The player's hand will only be complete if the player has a total value of twenty-one or a blackjack (i.e., initial hand with value of twenty-one).

If the player's hand is complete (i.e., blackjack), the dealer may immediately pay the player in step 208, or may wait to perform the step until all hands have been played. The dealer then places the player's hand into the discard shoe in step 210.

If the player's hand is not complete, the dealer offers the player an additional card in step 212. In step 214, the dealer determines whether the player stands. If the player does not stand the dealer deals another card to the player in step 216 and returns to step 206 to repeat the process 206-216 for the player. If the player stands, the dealer determines whether there are additional players in step 218. If there are additional players, the dealer selects the next player in step 220 and repeats the process 206-216 for the next player. This repeats until the dealer determines that there are no more additional players.

In step 222, the dealer determines whether the dealer's hand is complete (i.e., twenty-one or blackjack).

If the dealer's hand is complete, control passes to step 224. If the dealer's hand is not complete, the dealer determines whether the dealer stands in step 226. The house rules typically determine whether the dealer stands or takes another card. For example, the rule may require the dealer to stand if the value of the dealer's is 17 or more. Under some rules, the dealer may take another card if the value of the dealer's hand is a soft 17 (i.e., Ace counted as eleven). If the dealer does not stand, the dealer takes an additional card in step 228, and returns to step 222, repeating the process 222-228 until the dealer's hand is complete or the dealer stands. If the dealer stands, control passes to step 224.

In step 224, the dealer compares the dealer's hand to the players' hands, starting with the player on the dealer's far right (i.e., third base). In step 230, the dealer determines whether the player wins. If the player wins, the dealer pays the player in step 232. If the player does not win, the dealer collects the player's wager in step 234. In step 236, the dealer takes the player's hand and places the hand in the discard shoe. In step 238, the dealer determines if there are more players. If there are more players the dealer selects the next player in step 240 and returns to step 224. The dealer selects players from the dealer's right to left until the cards from the last player have been collected and placed in the discard shoe. The method terminates in step 242, and a new round of blackjack can be played.

Figure 11A:
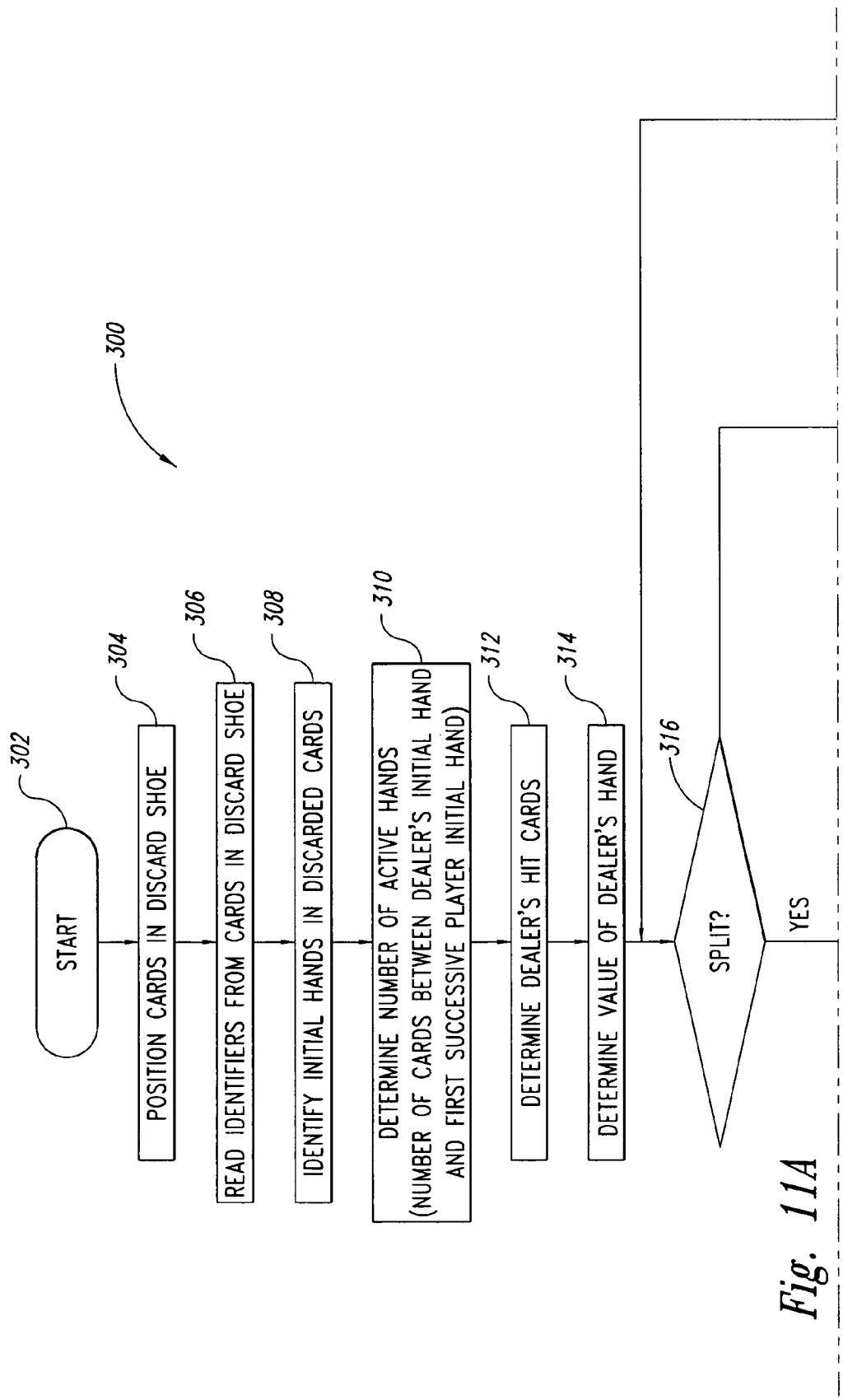
FIGS. 11A and 11B are a flow diagram of an illustrated method of operating a blackjack game including operating the game evaluation system of FIG. 1 for evaluating the game and game results.
Figure 11B:
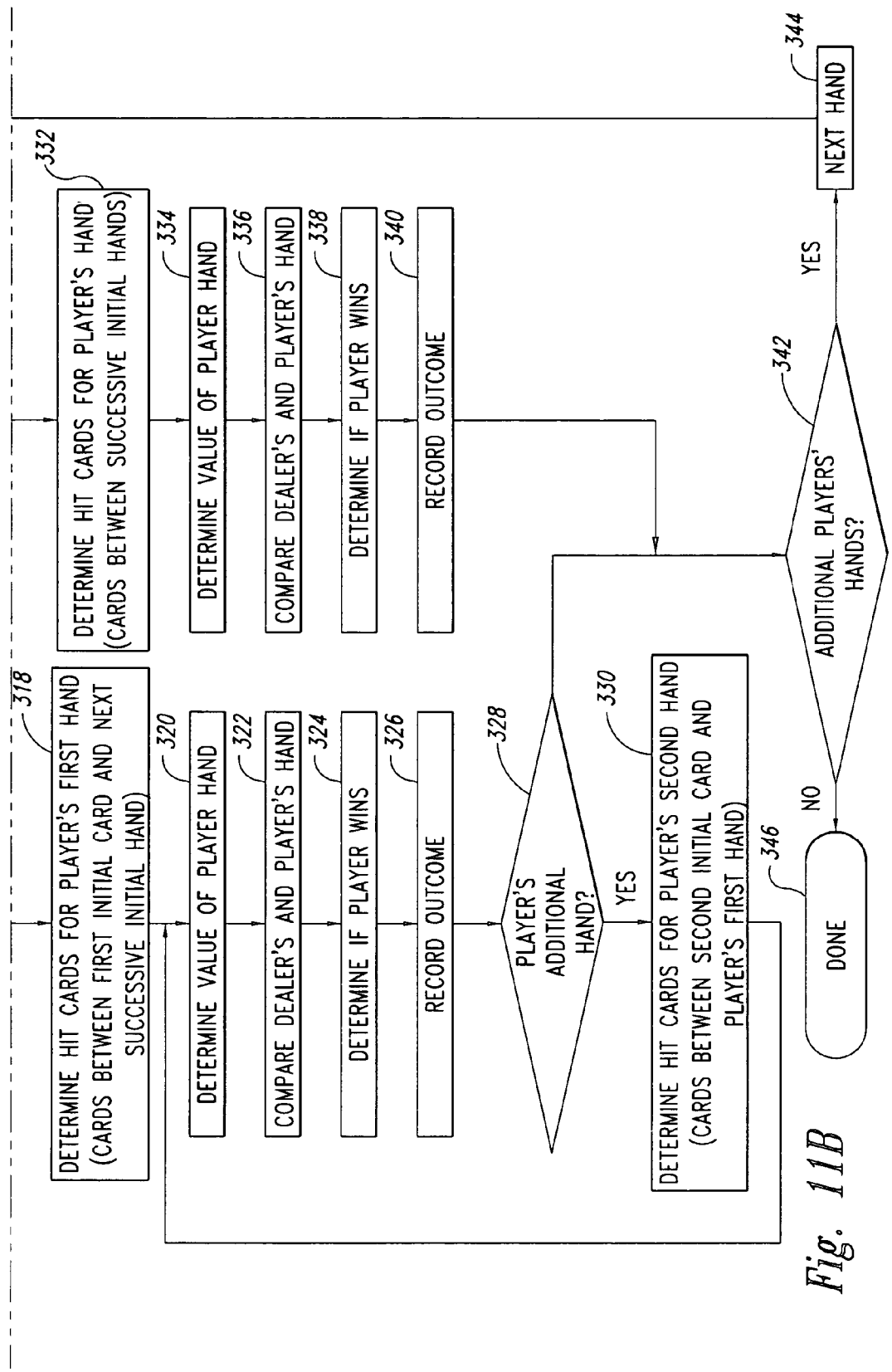

FIGS. 11A and 11B show a method 300 of operating a blackjack game including validating the game and game results. In particular, the method 300 identifies specific acts by the game evaluation system 10 after the hands have been completed, and would typically follow the acts of method 200. The method 300 starts at step 302.

In step 304, the dealer positions the cards in the discard shoe 16. In step 306, the discard card reader 60 reads the identifiers from the cards in the discard shoe 16. The discard card reader 60 may employ an incremental process, successively adjusting the field of view of the discard card reader 60 to read the identifiers from successive sets of discarded cards.

In step 308, the card game evaluation system 10 identifies the location of the initial hands in the read sequence of discarded cards. The card game evaluation system 10 knows the identity of the cards composing the initial hands from previously determining the initial hands based on a knowledge of the original sequence of the deck of cards and a knowledge of the dealer's initial hand, as explained above (FIG. 9).

In step 310, the card game evaluation system 10 determines the number of active hands. For example, the number of cards between the dealer's initial hand and the first card in the first successive player's initial hand. The card game evaluation system 10 may employ the previously determined number of active hands, if splits are not permitted or have not occurred. In step 312, the card game evaluation system 10 determines the dealer's hit cards. In step 314, the card game evaluation system 10 determines the value of the dealer's hand based on the value of the cards in the dealer's initial hand and the value of the dealer's hit cards.

In step 316, the card game evaluation system 10 determines whether a split hand has occurred. The method 300 branches based on the determination.

If a split hand has occurred, the method 300 follows a first branch 318. In step 318, the card game evaluation system 10 determines the hit cards for a player's first hand (i.e., cards between first initial card and next successive initial hand). The card game evaluation system 10 can employ its knowledge of the identity and sequence of cards collected from the dealer and players which comes from reading the identifiers from each of the cards by the discard card reader 60. The hit cards are typically the cards preceding the cards in the subject player's or dealer's initial hand that are not part of another player's or dealer's initial hand, which is most clearly illustrated in FIG. 15, below. In step 320, the card game evaluation system 10 determines the value of the player's hand. In step 322, the card game evaluation system 10 compares the value of the dealer's and player's hands. In step 324, the card game evaluation system 10 determines whether the player wins, and records the outcome in step 326. In step 328, the card game evaluation system 10 determines whether there are additional player's hands to analyze. If there are additional player's hands to analyze, the card game evaluation system 10 determines the hit cards for the player's additional hand in step 330, and returns to step 320.

If a split hand has not occurred, the method 300 follows a second branch 332-340. In step 332, the card game evaluation system 10 determines the hit cards for a player's hand (i.e., cards between successive initial hands). In step 334, the card game evaluation system 10 then determines the value of the player's hand. In step 336, the card game evaluation system 10 compares the value of the dealer's and player's hands. In step 338, the card game evaluation system 10 determines whether the player wins, and records the outcome in step 340.

In step 342, the card game evaluation system 10 determines whether there are hands to analyze for additional players. If there are additional players, the card game evaluation system 10 selects the next player's hand in step 344 and returns control to step 316. If there are no additional players, the method 300 terminates at step 346.

Figure 12:
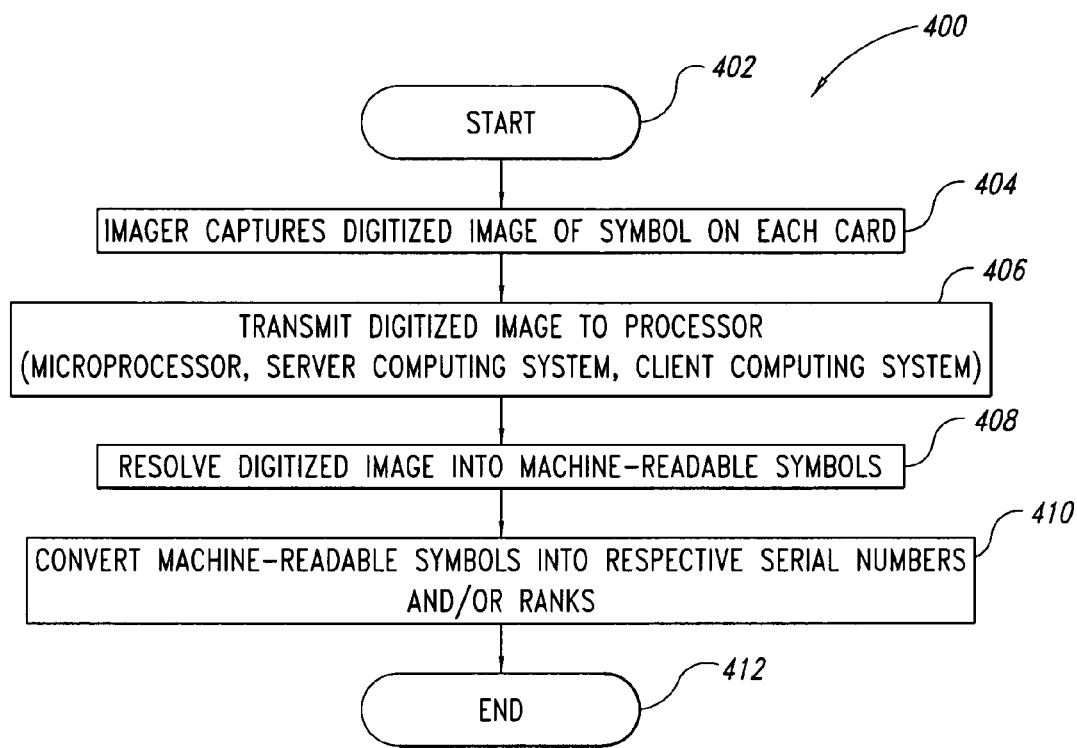
FIG. 12 is a flow diagram of a method of reading identifiers from the cards in the discard card reader.

FIG. 12 shows a method 400 of reading identifiers from cards 61 in the card guide 62 starting at step 402, which can implement the step 306 of method 300. In step 404, the imager 70 captures a digitized image of the symbol on each card 61. In step 406, digitized image is sent to either the microprocessor 88 (FIGS. 5 and 6), the server computing system 14 (FIG. 1), or one of the client computing systems 12. In step 408, the microprocessor 88, server computing system 14, or one of the client computing systems 12 resolves the digitized image into machine-readable symbols. In step 410, the microprocessor 88, server computing system 14, or one of the client computing systems 12 converts the machine-readable symbols into respective serial numbers and/or card ranks. The method 400 terminates at step 412.

Example

FIGS. 13-16 show an example blackjack game, illustrating the concepts discussed above, including the verification process.

FIG. 13 shows a portion of a deck of cards 93, from which the dealer deals to the players and herself during a game of blackjack. The sequence of cards in the portion of the deck of cards 93 is known from the prior reading of the deck of cards by the card deck reader 17A, 17B.

FIG. 14 shows the cards 23, 25 composing the dealer's initial hand 21. The identity of the cards composing the dealer's initial hand 21 are known from the use of the card hand reader 15. In this case, the dealer's top card 23 is the ace of spades and the dealer's hole card 25 is the eight of hearts.

The card game evaluation system 10 can determine the initial hands for each of the players based on a knowledge of the initial sequence of cards in the deck 93 and the identity of cards 23, 25 in the dealer's initial hand 21. The card game evaluation system 10 determines the number of active players from the number of cards appearing between the dealer's top card 23 and hole card 25 in the sequence of cards 93 (FIG. 13). In this case, there are three cards between the Ace of spades and the eight of hearts (i.e., the eight of clubs, ten of spades and seven of spades), and thus three active players.

Knowing that there are three active players in addition to the dealer, the card game evaluation system 10 can map the original sequence of cards to each of the players. From the first base to the third base position, each of the three players received a first card (i.e., two of hearts, nine of spades and seven of clubs, respectively) before the dealer's top card (i.e., Ace of spades). From the first base to the third base position, each of the three players received a second card (i.e., eight of clubs, ten of spades and seven of spades, respectively) before the dealer's hole card (i.e., eight of hearts). Thus, for players i from 1 through n, where i is the player position from the dealer's left to right, and n is the total number of players, the player's (i) initial hand is composed of a first card corresponding to the "$i^{th}$" card in the sequence of the deck and a second card corresponding the "$n+1+i^{th}$" card in the sequence of the deck. The initial hand of the dealer is composed of a first card corresponding to the "$n+1^{st}$" position in the sequence of the deck and a second card corresponding to the "$2n+2^{nd}$" position. The initial hands of the players and dealer in this example are shown in table 1, below.

TABLE 1

Initial cards

| | Initial Cards |
|---|---|
| Player 1 | 2 8 <br> ♡ ♣ |
| Player 2 | 9 10 <br> ♠ ♦ |
| Player 3 | 7 7 <br> ♣ ♠ |
| Dealer | A 8 <br> ♠ ♡ |

FIG. 15 shows the cards 94 found in the discard shoe 16, after the round. These may include all of the cards 94 in the discard shoe 16, or only the cards added to the discard shoe 16 since the last round of blackjack. The card game evaluation system 10 can then ascertain the players and dealer's hit cards based on the sequence of cards 94 in the discard shoe 16 and a knowledge of the player's and dealer's initial hands. For example, the dealer's initial hand 21 (i.e., Ace of spades, eight of hearts) is not preceded by any cards, thus the dealer did not have any hit cards. (Note: most casinos would not allow the dealer to hit with a hand having a value of eighteen.)

The second player's initial hand (i.e., nine of spades, ten of clubs) immediately follows the dealer's initial hand 21 (i.e., Ace of spades, eight of hearts). Thus, since there are no intervening cards, it is clear that the second player did not have any hit cards. One card (i.e., queen of hearts) immediately precedes the first player's initial hand (i.e., two of hearts, eight of clubs), and follows the second player's hand. Thus, the first player had one hit card, a queen having a value equal to 10. The third player has two cards immediately preceding the third player's initial hand (i.e., seven of clubs, seven of spades), and following the second player's hand. Thus, the third player received two hit cards, a ten of diamonds, followed by an Ace of clubs. The hit cards for a hand are found in a successive number of locations in the deck, starting at a position given by the formula 2n+2+the total number of hit cards taken by all previous positions, where n corresponds to the total number of player hands. This is dictated by the way blackjack is played, successively dealing two cards around the table to form the initial hands, including the dealer (i.e., 2n+2). Then each player is given an opportunity to take cards until the player's hand is complete (i.e., total number of hit cards taken by all previous positions).

The card game evaluation system 10 can automatically determine the value of the player's and dealer's hands, and can determine the outcome of the games between the various players and the dealer. The outcome of the games in this example are shown in table 2, below.

TABLE 2

Round Outcome

|  | Initial Cards | Hit Cards | Outcome |
|---|---|---|---|
| Player 1 | 2 8 ♡,♣ | Q ♡ | Win |
| Player 2 | 9 10 ♠,♦ |  | Push |
| Player 3 | 7 7 ♣,♦ | A 10 ♣,♦ | Bust |
| Dealer | A 8 ♦,♡ |  |  |

The dealer has an Ace and an eight for a total value of nineteen. The first player has a two, an eight and a queen, for a total value twenty, which beats the dealer's nineteen. The second player has a nine and ten for a total value of nineteen, which ties the dealer's total of nineteen. The third player has a pair of sevens, an Ace valued as one, and a ten for a total value of twenty-five. Twenty-five exceeds twenty-one the so third player busted on the final card (i.e., ten of diamonds).

The example is only slightly more complicated when one or more split hands occur, but the card game evaluation system 10 can employ the same general process to validate the game.

Figure 16:
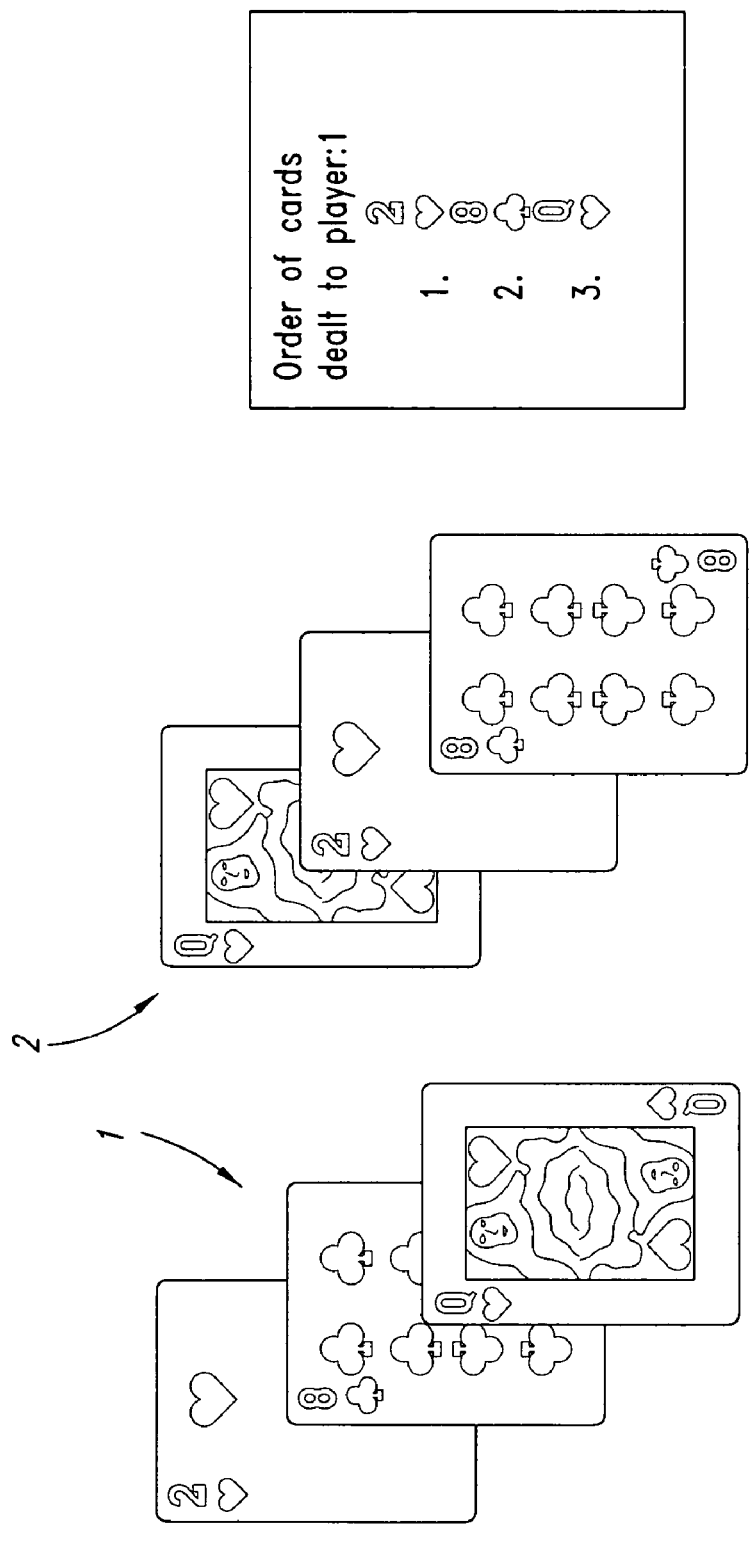
FIG. 16 is a schematic view contrasting a first player's completed hand in a game dealt from a shoe and in a game dealt by hand.

FIG. 16 shows that the order of cards in a player's completed hand will differ based on whether the card are dealt from a shoe or by hand. The cards are dealt in the order shown in the table, two of hearts, eight of clubs and Queen of hearts. In a shoe dealt game the completed hand 1 has the order two of hearts, eight of clubs and Queen of hearts. In a hand dealt game the completed hand 2 has the order Queen of hearts, two of hearts, and eight of clubs.

Figure 23:
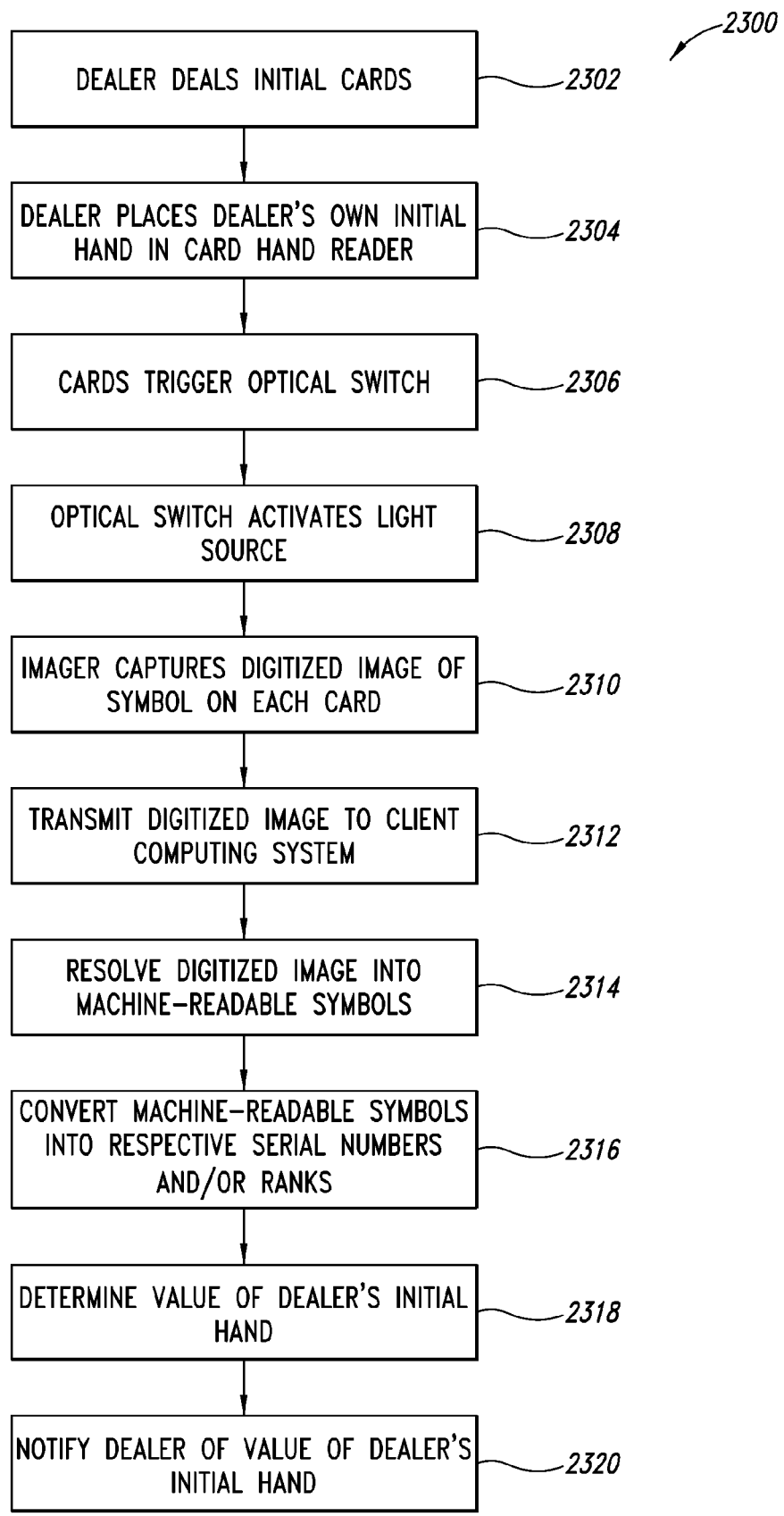
FIG. 23 is a flow diagram of an illustrated method of operation for the card game validation system of FIG. 1.

FIG. 23 shows an exemplary method 2300 of operation for the card game validation system 10.

In block 2302, the dealer deals the initial hand 21 (i.e., two cards, 23, 25) to each of the players and to the dealer, as generally described in the Background section. In block 2304, the dealer places the dealer's own cards 23, 25 (e.g., initial hand) into the slot 25 in the card hand reader 17A, 17B. The back faces of the cards 23, 25 each face a respective one of the prism portions 572, 574.

In block 2306, the insertion of the cards 23, 25 trigger the optical switch 64 when the cards 23, 25 are properly positioned within the card hand reader 15 to be imaged. In block 108, the optical switch 564 activates the illumination sources 586. The optical switch 564 can rapidly turn the illumination sources 586 ON and OFF, causing the imager 570 to capture a momentary image of the machine-readable symbols on the cards 23, 25. Alternatively, the illumination sources 586 may remain in the ON state, and the optical switch 564 can activate the imager 570 to capture the desired image.

In block 2310, the imager 570 captures a digitized image of the respective machine-readable symbol on each of the cards 23, 25. In block 2312, the card hand reader 15 transmits the digitized image to the client computing system 12, either directly or over the network 18.

In block 2314, the client computing system 12 resolves the digitized image into machine-readable symbols. In block 2316, the client computing system 12 converts the machine-readable symbols into respective serial numbers, and/or rank. Since the method 2300 is only directed to determining the value of the dealer's hand 21, the card's 23, 25 suits do not need to be determined.

In block 2318, the client computing system 12 determines the value of the dealer's initial hand 21. The value can be determined based on the serial number that uniquely identifies each card 23, 25, for example by way of a lookup table or database search of data in the database 34 or other database (not shown) associated with one of the client computing systems 12. For example, the serial numbers for each deck 27 can be maintained in a central database 34, associated with the server computing system 14, or with the client computing system 12. Alternatively, the value of the cards 27 can be directly encoded into the machine-readable symbols carried by each card. The client computing system 12 can total the values of the two cards 23, 25 to determine the value of the dealer's initial hand 21. Knowledge of the value of the dealer's initial hand 21 can effect the play of the game. For example, the dealer may be able to immediately pay players having blackjack if it is known that the dealer's hand 21 is not also a blackjack. The dealer may also be able to offer the player's the opportunity to surrender.

In block 2320, the client computing system 12 notifies the dealer of the value of the dealer's initial hand, and/or status of the dealer's initial hand such a blackjack or not blackjack. The notification can come via an indicator at the gaming table (not shown), for example a digital display such as an LCD touch screen, or a light 55 positioned on the card hand reader 15 or elsewhere on the gaming table. The visual display or light 55 is placed such that it is visible to the dealer, but not visible to the players.

Figure 24A:
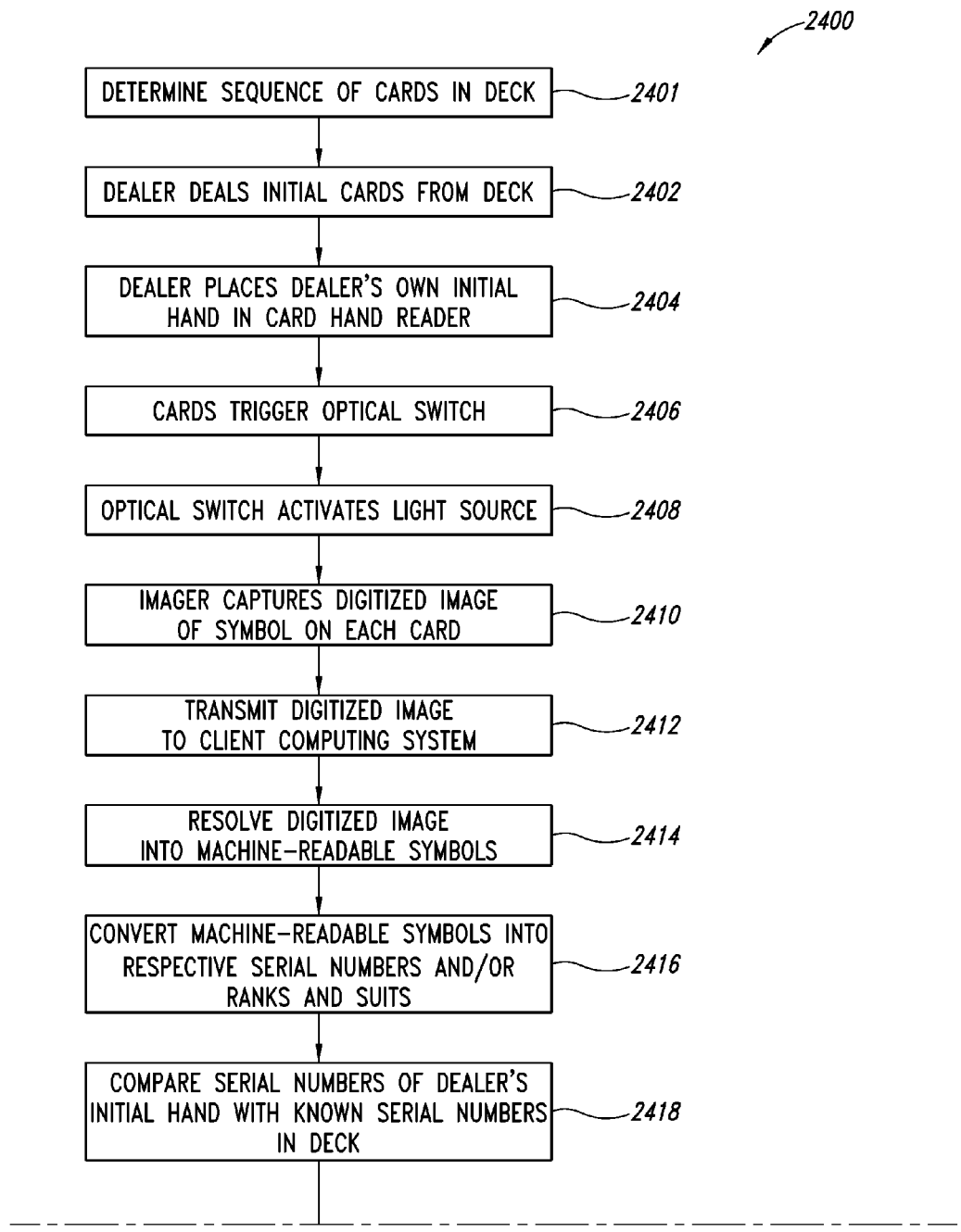
FIGS. 24A and 24B are a flow diagram of another illustrated method of operation for the card game validation system of FIG. 1.
Figure 24B:
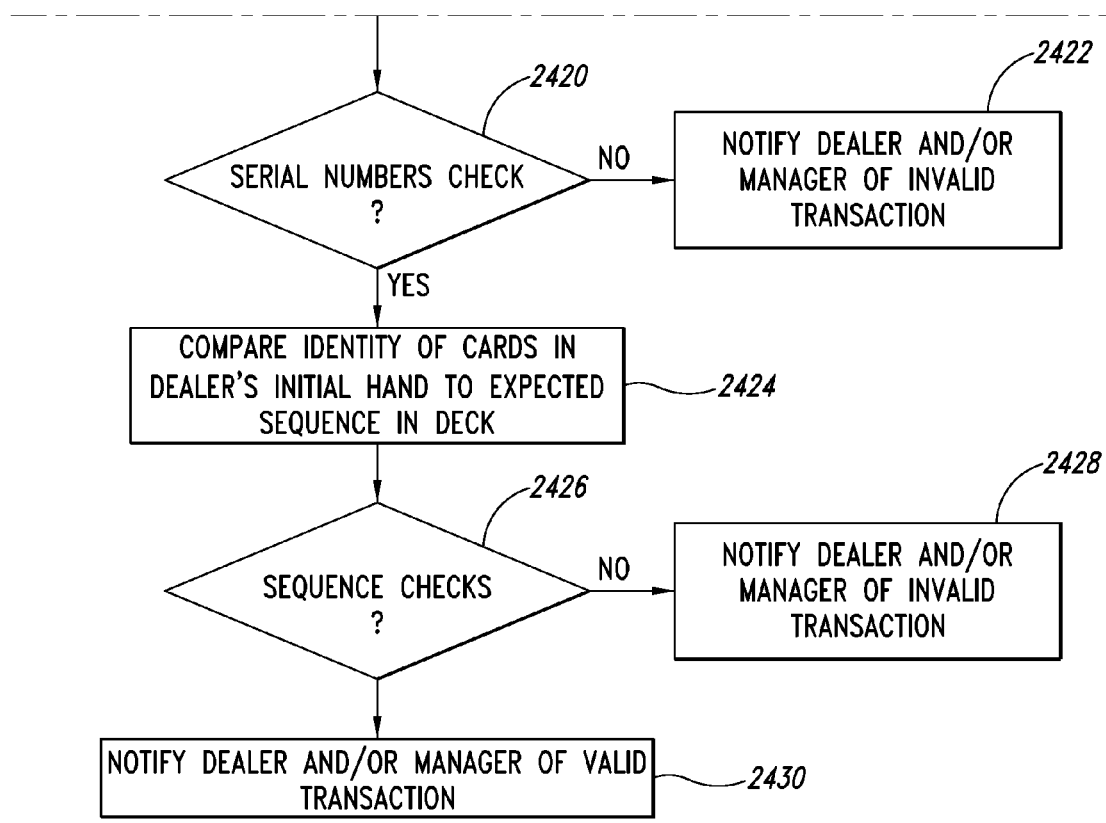

FIGS. 24A and 24B show another exemplary method 2400 of operation for the card game validation system 10.

In block 2401, the deck reader 17A, 17B determines the sequence of cards in the deck 27.

In block 2402, the dealer deals the initial hand 21 (i.e., two cards 23, 25) to each of the players and to the dealer, as generally described in the Background section. In block 2404, the dealer places the dealer's own cards 23, 25 into the slot 19 in the card hand reader 15, such that an identifier on each of the cards 23, 25 is facing a respective one of the prism portions 572, 574.

In block 2406, the insertion of the cards 23, 25 trigger the optical switch 564 when the cards 23, 25 are properly positioned with the card hand reader 15 to be imaged. In block 2408, the optical switch 564 activates the illumination sources 586. As discussed above, the optical switch 564 operates the illumination sources 586 and/or the imager 570 to capture the desired image of the identifiers on the cards 23, 25.

In block 2410, the imager 570 captures a digitized image of the respective machine-readable symbol on each of the cards 23, 25. In block 2412, the card hand reader 15 transmits the digitized image to the client computing system 12, either directly or over the network 18.

In block 2414, the client computing system 12 resolves the digitized image into machine-readable symbols. In block 2416, the client computing system 12 converts the machine-readable symbols into respective serial numbers, and/or ranks and suits. Since the method 2400 is directed to uniquely identifying the cards with respect to the entire deck, and not just the value of the dealer's hand, the rank and suit would need to be determined, if the client computing system 12 was not relying on the serial number.

In block 2418, the client computing system 12 compares the serial number of the cards 23, 25 in the dealer's initial hand 21, with the known serial number of cards in the deck 27. If the serial number of the cards 23, 25 in the dealer's initial hand 21 do not match the serial number of cards in the deck 27, the client computing system 12 notifies the dealer and or a manager (e.g., pit boss) of the discrepancy in block 2422, and may even terminate the game. The notification can come via an indicator at the gaming table, for example a digital display or a light 55. The visual display or light 55 is placed such that it is visible to the dealer, but not visible to the players. If the serial number of the cards 23, 25 in the dealer's initial hand 21 does match the serial number of cards in the deck 27, the client computing system 12 passes control to block 2424.

In block 2424, the client computing system 12 compares the identity of the cards 23, 25 in the dealer's hand 21, with the expected sequence of cards in the deck 27. In a simple scenario, this takes the form of comparing the order of the top and bottom cards 23, 25 with the order in the deck 27, to ensure that the cards were dealt in the correct order. In more complicated analysis, a knowledge of the number of players, and/or hands dealt and the initial deck sequence allows the client computing system to ensure that the dealer's hand is composed of the correct cards.

If the identity of the cards 23, 25 in the dealer's hand 21 does not correspond with the expected sequence of cards in the deck 27, the client computing device 12 notifies the dealer and or a manager (e.g., pit boss) of the discrepancy in block 2428, and may even terminate the game. The notification can again come via an indicator at the gaming table, for example a digital display or a light 55. If the identity of the cards 23, 25 in the dealer's hand 21 does correspond with the expected sequence of cards in the deck 27, the client computing device 12 can notify the dealer and/or manager in block 2430, allowing the game to continue.

Summary

Although specific embodiments, and examples for, the invention are described herein for illustrative purposes, various equivalent modifications can be made without departing from the spirit and scope of the invention, as will be recognized by those skilled in the relevant art. The teachings provided herein of the invention can be applied to other systems for evaluating card games, not necessarily the blackjack card evaluation system 10 generally described above. For example, the teachings can employ other networks, such as the World Wide Web portion of the Internet. The various embodiments described above can be combined to provide further embodiments. For example, the illustrated methods can be combined, or performed successively. The illustrated methods can omit some acts, can add other acts, and can execute the acts in a different order than that illustrated to achieve the advantages of the invention. All of the above U.S. patents, patent applications and publications referred to in this specification are incorporated by reference, including but not limited to U.S. Ser. No. 09/790,480, filed Feb. 21, 2001; U.S. Ser. No. 10/360,508, filed Feb. 7, 2003; U.S. Ser. No. 11/059,743, filed Feb. 17, 2005; U.S. Ser. No. 10/756,044, filed Jan. 13, 2004; U.S. Ser. No. 10/017,277, filed Dec. 13, 2001; U.S. Ser. No. 09/474,858, filed Dec. 30, 1999; and U.S. 60/130,368, filed Apr. 21, 1999. Aspects of the invention can be modified, if necessary, to employ systems, circuits and concepts of the various patents, applications and publications to provide yet further embodiments of the invention.

These and other changes can be made to the invention in light of the above detailed description. In general, in the following claims, the terms used should not be construed to limit the invention to the specific embodiments disclosed in the specification, but should be construed to include all computers, networks and card reading and card evaluation systems that operate in accordance with the claims. Accordingly, the invention is not limited by the disclosure, but instead its scope is to be determined entirely by the following claims.

What is claimed is:

1. An automated system to monitor card games played with playing cards, the automated system comprising:
    a card reader that reads identifying information from a first plurality of collected playing cards received by the card reader, the collected playing cards forming a first number (N), which is at least two, of hands of collected playing cards collected from at least two participants of a card game; and
    at least one processor coupled to the card reader to receive a sequence of identifying information read by the card reader, wherein the sequence of identifying information corresponds to an order of the collected playing cards are received by the card reader, and that determines a succession of collected playing card identities based at least in part on the sequence of identifying information, wherein the succession of collected playing card identities is comprised of respective playing card identities corresponding to the first plurality of collected playing cards, and that determines a second number (M) of sets of playing card identities from the succession of collected playing card identities, the first number (N) and the second number (M) being the same value, based at least in part on an order of the succession of collected playing card identities and a specified pick-up order of the first number (N) of collected hands of playing cards, wherein each respective set of playing card identities of the second number (M) of sets of playing card identities corresponds to a respective hand of collected playing cards of the first number (N) of collected hands of playing cards, and that further determines a respective value of a respective hand of collected playing cards based on the corresponding respective set of playing card identities for each one of the first number (N) of hands of collected playing cards.

2. The automated system of claim 1, further comprising:
    a deck reader that reads identifying information from a second plurality of playing cards forming a deck of playing cards from which the card game is dealt.

3. The automated system of claim 1, further comprising:
    a dealer's hand reader having a surface with an opening to a slot that is sized and shaped to have each playing card of a second plurality of playing cards that form an initial hand of playing cards of a dealer inserted therein and that reads during a round of the card game identifying information from each of the second plurality of playing cards inserted therein, wherein the second plurality of playing cards forming the dealer's initial hand of playing cards are read after the second plurality of playing cards forming the dealer's initial hand of playing cards in the round of the card game are dealt and before any of the first plurality of playing cards dealt in the round of the card game are collected from the participants.

4. The automated system of claim 3 wherein the dealer's hand reader concurrently reads identifying information from two overlapping playing cards that are concurrently inserted into the slot.

5. The automated system of claim 3 wherein the dealer's hand reader includes:
at least one reader that reads the identifying information; and
a stop that engages a respective first end of each playing card inserted therein such that the respective identifying information carried by each respective playing card inserted therein is in registration with the at least one reader.

6. The automated system of claim 1 wherein the card reader reads the identifying information as machine-readable symbols.

7. The automated system of claim 1 wherein the at least two participants of the card game include a dealer and a number of players, and wherein the processor is further determines a winner based on the determined value of a respective player's completed hand of playing cards and a determined value of a dealer's completed hand of playing cards for each of a number of players.

8. The automated system of claim 1 wherein the at least two participants include a dealer and a number of players, and wherein the processor determines a winner between the respective player and the dealer based on the determined value of the respective player's completed hand of playing cards and the determined value of the dealer's completed hand of playing cards for each player of the number of players.

9. The automated system of claim 1 wherein the processor determines a second number (M) of sets of playing card identities from the succession of collected playing card identities, the first number (N) and the second number (M) being the same value, by parsing the second number (M) of sets of playing card identities from the succession of collected playing card identities.

10. The automated system of claim 1 wherein the processor parses the second number (M) of sets of playing card identities from the succession of collected playing card identities by locating in the succession of collected playing card identities a first respective identity that corresponds to a first respective collected playing card determined to belong to a first respective hand of playing cards and locating in the succession of collected playing card identities a second respective identity that corresponds to a second respective collected playing card determined to belong to a second respective hand of playing cards.

11. The automated system of claim 10 wherein the processor determines the first respective collected playing card belongs to the first respective hand of playing cards and the second respective collected playing card belongs to the second respective hand of playing cards based at least on a dealing order of the first plurality of playing cards.

12. The automated system of claim 1 wherein the card reader further includes an imager having a field of view that simultaneously encompasses a respective playing card end of multiple ones of the first plurality of collected playing cards, the imager captures an image of the multiple playing card ends and provides the image of the multiple playing card ends to the processor, and wherein the processor determines the succession of playing card identities based at least in part on an order of the imaged multiple playing card ends.

13. An automated system to monitor a card game played with playing cards, wherein a first plurality of playing cards from at least one deck of playing cards are dealt in a dealing sequence to at least two participants of the card game at a beginning of a round of the card game, and each respective participant of the at least two participants is dealt, from the first plurality of playing cards, at least two respective playing cards that form a respective hand of playing cards, and wherein a first number (N), which has a value that is at least two, of the hands of playing cards of the at least two participants are collected in a specified pick-up order after the round of the card game, the automated system comprising:
a card reader that reads a respective identifier from each of the first plurality of collected playing cards;
at least one processor that receives a sequence of identifiers, the sequence of identifiers containing the respective identifiers read by the card reader where the respective identifiers of the sequence of identifiers are in an order corresponding to an order in which the first plurality of collected playing cards are received by the card reader, the order in which the collected playing cards are received by the card reader being different from the dealing sequence;
at least one computer readable storage medium; and
an evaluation module that is stored in the at least one computer readable storage medium and that is configured, when executed by the at least one processor, to:
determine a respective identity of a respective collected playing card based at least in part on the respective identifier read from the respective collected playing card for each of the first plurality of collected playing cards;
determine a succession of playing card identities, each playing card identity being a respective determined identity of a respective collected playing card;
determine a second number (M) of sets of playing cards identities from the succession of playing card identities based at least on the succession of playing card identities, the first number (N) and the second number (M) being the same value, wherein each respective set of playing card identities corresponds to a respective hand of collected playing cards; and
for each of the participants, determine a respective value of the respective participant's hand of playing cards based at least in part on the corresponding set of playing card identities and the determined respective playing card identities forming the corresponding set of playing card identities.

14. The automated system of claim 13 wherein the at least two participants include a player and a dealer, and wherein the evaluation module is further configured to determine an outcome of the card game based on the determined value of the player's completed hand of playing cards and the determined value of the dealer's completed hand of playing cards.

15. The automated system of claim 13 wherein the evaluation module is further configured to determine the dealing sequence of number of playing cards in the at least one deck of playing cards from which the card game is dealt, prior to dealing any of the playing cards from the deck in the card game.

16. The automated system of claim 13 wherein the evaluation module is further configured to read a respective identifier from each of a number of playing cards forming a dealer's initial hand of playing cards before any playing cards in the card game are collected.

17. The automated system of claim 13 wherein card reader further includes an imager having a field of view that simultaneously encompasses a respective playing card end of multiple ones of the first plurality of collected playing cards, the imager captures an image of the multiple playing card ends and provides the image of the multiple playing card ends to the processor, and wherein the processor determines the succession of playing card identities based at least in part on an order of the imaged multiple playing card ends.

18. The automated system of claim 13, further comprising: a dealer's hand reader having a surface with an opening to a slot that is sized and shaped to have each playing card of a plurality of playing cards that form an initial hand of playing cards of a dealer inserted therein and withdrawn therefrom, the dealer's hand reader concurrently reads during a round of the card game identifying information from each of the plurality of playing cards inserted therein, wherein the playing cards forming the dealer's initial hand of playing cards are read after the playing cards forming the dealer's initial hand of playing cards in the round of the card game are dealt and before any of the playing cards dealt in the round of the card game are collected from the participants.

19. The automated system of claim 18 wherein the dealer's hand reads identifying information from two overlapping playing cards that are concurrently inserted into the slot.

20. The automated system of claim 18 wherein the dealer's hand reader includes:
   at least one reader that reads the identifying information; and
   a stop that engages a respective first end of playing card inserted therein such that the respective identifying information carried by each respective playing card inserted therein is in registration with the at least one reader.

21. A computer-readable storage device storing instructions for causing a processor of a computing device to monitor a card game played with playing cards, wherein a number of playing cards from at least one deck of playing cards are dealt in a dealing sequence to at least two participants of the card game at a beginning of a round of the card game, and each respective participant of the at least two participants is dealt a respective plurality of playing cards that form a respective hand of playing cards, and wherein the hands of playing cards of the at least two participants are collected in a specified pick-up order after the round of the card game, by:
   determining a respective identity of each playing card of a number of playing cards forming collected complete hands of playing cards from playing cards collected in a specified pick-up order from at least two participants in a card game, the two participants including at least one player and a dealer;
   determining a succession of collected playing card identities comprised of the respective identity of each playing card of the number of playing cards forming collected complete hands of playing cards based on the playing cards collected in the specified pick-up order;
   determining a set of playing cards that form a respective one of the collected complete hands of playing cards based at least in part on the determined succession of collected playing card identities and based at least in part on the specified pick-up order;
   determining a respective value of the at least one player's collected complete hand of playing cards based at least on the determined set of playing cards that form a respective one of the collected complete hand of playing cards;
   determining a value of the dealer's collected complete hand of playing cards based at least on the determined set of playing cards that form a respective one of the collected complete hand of playing cards; and
   for each of the at least one players, determining a respective outcome of the card game.

22. The computer-readable storage device of claim 21 wherein determining a respective outcome of the card game for each of the at least one players comprises comparing the respective value of the respective player's collected complete hand of playing cards to a threshold value, and determining that the respective player lost if the respective value of the respective player's collected complete hand of playing cards exceeds the threshold value.

23. The computer-readable storage device of claim 22 wherein comparing the respective value of the respective player's collected complete hand of playing cards to a threshold value comprises comparing the respective value of the respective player's collected complete hand of playing cards to a value equal to twenty-one.

24. The computer-readable storage device of claim 23 wherein determining a respective outcome of the card game for each of the at least one players further comprises comparing the respective value of the player's collected complete hand of playing cards to the value of the dealer's collected complete hand of playing cards.

25. The computer-readable storage device of claim 21 wherein instructions cause the processor to monitor a card game played with playing cards further by:
   determining a sequence of identities of a set of playing cards in a deck of playing cards from which the card game is dealt, prior to dealing any of the playing cards from the deck in a card game.

26. The computer-readable storage device of claim 25 wherein instructions cause the processor to monitor a card game played with playing cards further by:
   determining an expected set of identities of playing cards for the player's collected complete hand playing cards based at least in part on the determined sequence of identities of the set of playing cards in the deck of playing cards from which the card game is dealt;
   for each set of playing cards that form a respective one of the collected complete hands of playing cards, comparing a respective determined set of identities consisting of the respective identities of each of the number of playing cards from the player's collected complete hand of playing cards to the expected set identities of playing cards for the player's collected complete hand of playing cards; and
   producing a notification if the determined set of identities does not match the expected set of playing cards for the player's completed hand identities.

27. An automated system to monitor card games played with playing cards, the automated system comprising:
   a card reader that reads identifying information from a number of playing cards forming at least two hands of playing cards collected from at least two participants of a card game after an end of a round of a card game; and
   at least one processor coupled to the card reader that receives the read identifying information from the card reader and that determines a respective identity of each playing card forming the at least two hands of playing cards collected from the at least two participants and that determines each of the at least two hands of playing cards based at least in part on an order of a succession of the read identifying information and a pick-up order of the collected hands of playing cards and that determines after the end of the round of the card game a respective value of each of the at least two hands of playing cards based on the respective identity of each of the playing cards forming the respective hand of playing cards.

* * * * *